US012615117B2

(12) United States Patent
Go et al.

(10) Patent No.: US 12,615,117 B2
(45) Date of Patent: Apr. 28, 2026

(54) METHOD AND DEVICE FOR TRANSMITTING OR RECEIVING CHANNEL STATE INFORMATION IN WIRELESS COMMUNICATION SYSTEM

(71) Applicant: LG ELECTRONICS INC., Seoul (KR)

(72) Inventors: Seongwon Go, Seoul (KR); Hyungtae Kim, Seoul (KR); Jiwon Kang, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 332 days.

(21) Appl. No.: 18/557,807

(22) PCT Filed: May 2, 2022

(86) PCT No.: PCT/KR2022/006260
§ 371 (c)(1),
(2) Date: Oct. 27, 2023

(87) PCT Pub. No.: WO2022/240042
PCT Pub. Date: Nov. 17, 2022

(65) Prior Publication Data
US 2024/0204953 A1 Jun. 20, 2024

(30) Foreign Application Priority Data

May 11, 2021 (KR) ......................... 10-2021-0060839
Aug. 12, 2021 (KR) ......................... 10-2021-0106910

(51) Int. Cl.
*H04L 5/00* (2006.01)
*H04B 17/318* (2015.01)
(Continued)

(52) U.S. Cl.
CPC ......... *H04L 5/0051* (2013.01); *H04B 17/328* (2023.05); *H04B 17/336* (2015.01); *H04W 24/10* (2013.01)

(58) Field of Classification Search
CPC ... H04L 5/0051; H04L 1/0026; H04L 5/0057; H04L 1/0029; H04B 17/328;
(Continued)

(56) References Cited

U.S. PATENT DOCUMENTS

2020/0067590 A1    2/2020 Wang et al.
2021/0111818 A1    4/2021 Zhu
(Continued)

FOREIGN PATENT DOCUMENTS

WO    WO-2018232090 A1 * 12/2018 ............. H04B 7/066

OTHER PUBLICATIONS

PCT International Application No. PCT/KR2022/006260, International Search Report dated Aug. 12, 2022, 3 pages.
(Continued)

*Primary Examiner* — Austin J Moreau
(74) *Attorney, Agent, or Firm* — LEE, HONG, DEGERMAN, KANG & WAIMEY

(57) ABSTRACT

Disclosed are a method and a device for transmitting or receiving channel state information in a wireless communication system. A method for transmitting channel state information (CSI) according to an embodiment of the present disclosure may comprise the steps of receiving, from a base station, first configuration information related to a CSI report and second configuration information related to a CSI resource, wherein the second configuration information includes information on M (M is a natural number) CSI resource sets associated with the first configuration information on the basis of a group-based report being configured by the first configuration information; receiving, from the
(Continued)

base station, a CSI-reference signal (CSI-RS) on a plurality of CSI resources of the M CSI resource sets on the basis of the second configuration information; and transmitting the CSI to the base station on the basis of the first configuration information.

10 Claims, 15 Drawing Sheets

(51) Int. Cl.
  *H04B 17/336* (2015.01)
  *H04W 24/10* (2009.01)
(58) Field of Classification Search
  CPC .. H04B 17/336; H04B 7/0626; H04B 7/0641;
      H04B 17/318; H04B 7/0408; H04B
      7/0417; H04B 7/06; H04W 24/10; Y02D
      30/70
  See application file for complete search history.

(56) References Cited

U.S. PATENT DOCUMENTS

| 2023/0283426 A1* | 9/2023 | Liu | H04L 5/0035 |
| | | | 370/329 |
| 2024/0056247 A1* | 2/2024 | Muruganathan | H04L 5/0035 |
| 2024/0154667 A1* | 5/2024 | Matsumura | H04L 5/0051 |
| 2024/0187077 A1* | 6/2024 | Karjalainen | H04B 7/06952 |
| 2024/0267174 A1* | 8/2024 | Liu | H04B 7/0695 |

OTHER PUBLICATIONS

Vivo, "Further discussion on MTRP multibeam enhancement," R1-2102509, 3GPP TSG RAN WG1 #104b-e, e-Meeting, Apr. 2021, 13 pages.
Apple Inc., "On Multi-TRP Beam Management Enhancement," R1-2101353, 3GPP TSG-RAN WG1 Meeting #103-e, e-Meeting, Feb. 2021, 8 pages.
Samsung, "Enhancements on beam management for multi-TRP," R1-2103224, 3GPP TSG RAN WG1 #104b-e, e-Meeting, Apr. 2021, 6 pages.

* cited by examiner

FIG.13
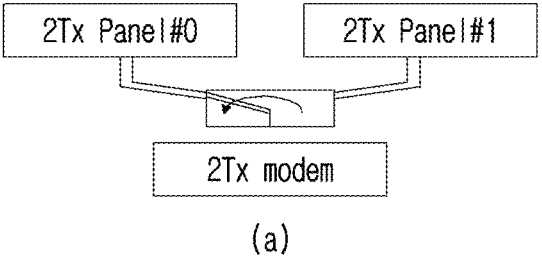
(a)
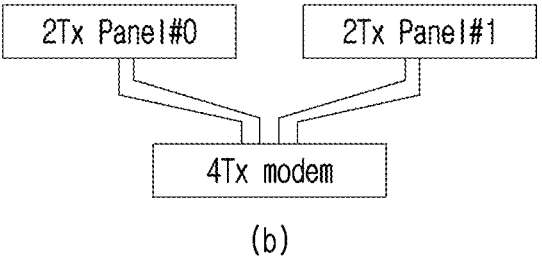
(b)

| Resource set 1 | Resource set 2 | |
|---|---|---|
| 1st CRI of pair #1 | 2nd CRI of pair #1 | |
| 1st CRI of pair #2 | 2nd CRI of pair #2 | |
| 1st CRI of pair #3 | 2nd CRI of pair #3 | |
| 1st CRI of pair #4 | 2nd CRI of pair #4 | |
| RSRP | differential RSRP | |
| differential RSRP | differential RSRP | |
| differential RSRP | differential RSRP | |
| differential RSRP | differential RSRP | |

(a) Global diffrential reporting

| Resource set 1 | Resource set 2 | |
|---|---|---|
| 1st CRI of pair #1 | 2nd CRI of pair #1 | |
| 1st CRI of pair #2 | 2nd CRI of pair #2 | |
| 1st CRI of pair #3 | 2nd CRI of pair #3 | |
| 1st CRI of pair #4 | 2nd CRI of pair #4 | |
| RSRP | RSRP | |
| differential RSRP | differential RSRP | |
| differential RSRP | differential RSRP | |
| differential RSRP | differential RSRP | |

(b) Diffrential reporting within set

| Resource set 1 | Resource set 2 | |
|---|---|---|
| 1st CRI of pair #1 | 2nd CRI of pair #1 | |
| 1st CRI of pair #2 | 2nd CRI of pair #2 | |
| 1st CRI of pair #3 | 2nd CRI of pair #3 | |
| 1st CRI of pair #4 | 2nd CRI of pair #4 | |
| RSRP | differential RSRP | |
| RSRP | differential RSRP | |
| RSRP | differential RSRP | |
| RSRP | differential RSRP | |

(c) Differential reporting within pair

FIG.15
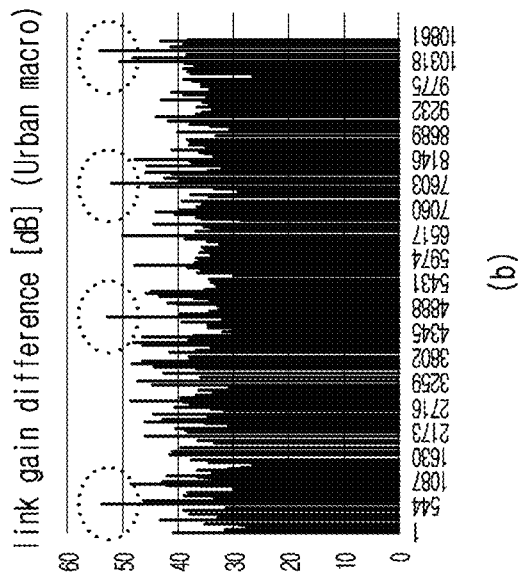
(b)
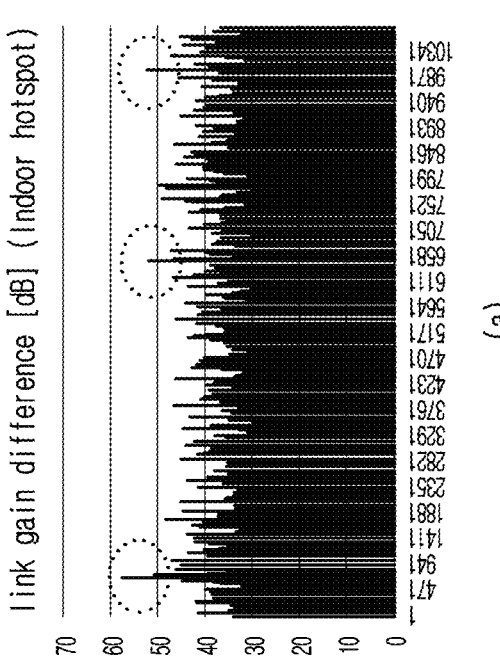
(a)

METHOD AND DEVICE FOR TRANSMITTING OR RECEIVING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2022/006260, filed on May 2, 2022, which claims the benefit of earlier filing date and right of priority to Korean Application Nos. 10-2021-0060839, filed on May 11, 2021, and 10-2021-0106910, filed on Aug. 12, 2021, the contents of which are all hereby incorporated by reference herein in their entireties.

TECHNICAL FIELD

The present disclosure relates to a wireless communication system, and in more detail, relates to a method and an apparatus of transmitting and receiving channel state information (CSI) in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving CSI.

In addition, an additional technical object of the present disclosure is to provide a method and an apparatus of transmitting and receiving CSI for TRP-specific beam management in transmitting and receiving multiple transmission reception points (TRPs).

The technical objects to be achieved by the present disclosure are not limited to the above-described technical objects, and other technical objects which are not described herein will be clearly understood by those skilled in the pertinent art from the following description.

A method of transmitting channel state information (CSI) in a wireless communication system according to an aspect of the present disclosure may include: receiving, from a base station, first configuration information related to CSI reporting and second configuration information related to CSI resources, wherein based on group-based reporting being configured by the first configuration information, the second configuration information includes information on M (M is a natural number) CSI resource set associated with the first configuration information; receiving, from the base station, a CSI-reference signal (CSI-RS) on a plurality of CSI resources of the M CSI resource set based on the second configuration information; and transmitting, to the base station, the CSI based on the first configuration information. Based on reporting for N (N is a natural number) CSI resource groups being configured by the first configuration information, each of the N CSI resource groups may be configured with M CSI resources including one CSI resource from each of the M CSI resource sets, the M CSI resources for each of the N resource groups may be simultaneously received by the UE, the CSI may include i) a layer 1-reference signal received power (L1-RSRP) value or a layer 1-signal to interference and noise ratio (L1-SINR) value for a specific CSI resource within N' (N' is a natural number, $2 \leq N' \leq N$) CSI resource group and ii) differential L1-RSRP values or L1-SINR values for CSI resources other than the specific CSI resource in the N' CSI resource groups, the differential L1-RSRP values or L1-SINR values may be calculated with reference to the L1-RSRP value or L1-SINR value for the specific CSI resource, and the CSI may further include information indicating a CSI resource set associated with the specific CSI resource.

A method of receiving channel state information (CSI) in a wireless communication system according to an additional aspect of the present disclosure may include: transmitting, to a user equipment (UE), first configuration information related to CSI reporting and second configuration information related to CSI resources, wherein based on group-based reporting being configured by the first configuration information, the second configuration information includes information on M (M is a natural number) CSI resource set associated with the first configuration information; transmitting, to the UE, a CSI-reference signal (CSI-RS) on a plurality of CSI resources of the M CSI resource set based on the second configuration information; and receiving, from the UE, the CSI based on the first configuration information. Based on reporting for N (N is a natural number) CSI resource groups being configured by the first configuration information, each of the N CSI resource groups may be configured with M CSI resources including one CSI resource from each of the M CSI resource sets, the M CSI resources for each of the N resource groups may be simultaneously received by the UE, the CSI may include i) a layer 1-reference signal received power (L1-RSRP) value or a layer 1-signal to interference and noise ratio (L1-SINR) value for a specific CSI resource within N' (N' is a natural number, $2 \leq N' \leq N$) CSI resource group and ii) differential L1-RSRP values or L1-SINR values for CSI resources other than the specific CSI resource in the N' CSI resource groups, the differential L1-RSRP values or L1-SINR values may be calculated with reference to the L1-RSRP value or L1-SINR value for the specific CSI resource, and the CSI may further include information indicating a CSI resource set associated with the specific CSI resource.

According to an embodiment of the present disclosure, even if a user equipment (UE) performs group-based beam reporting regardless of the number of channel state information resource pairs/groups configured by a base station, there is no ambiguity in the transmission and reception of channel state information, and the complexity of blind detection may not increase.

In addition, according to an embodiment of the present disclosure, in beam reporting, group-based beam reporting can be smoothly performed even if the difference in the differential value is large.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 12 is a diagram which illustrates resource allocation in a time and frequency domain related to a downlink beam management operation in a wireless communication system to which the present disclosure may be applied.

FIG. 13 is a diagram illustrating multi panel terminals in a wireless communication system to which the present disclosure may be applied.

FIG. 14 illustrates a differential RSRP/SINR reporting method for a plurality of beam groups in CSI reporting.

FIG. 15 illustrates a result of an experiment on differences in RSRP when different panels of a UE transmit and receive with different TRPs in an M-TRP environment.

DETAILED DESCRIPTION

Figure 1:
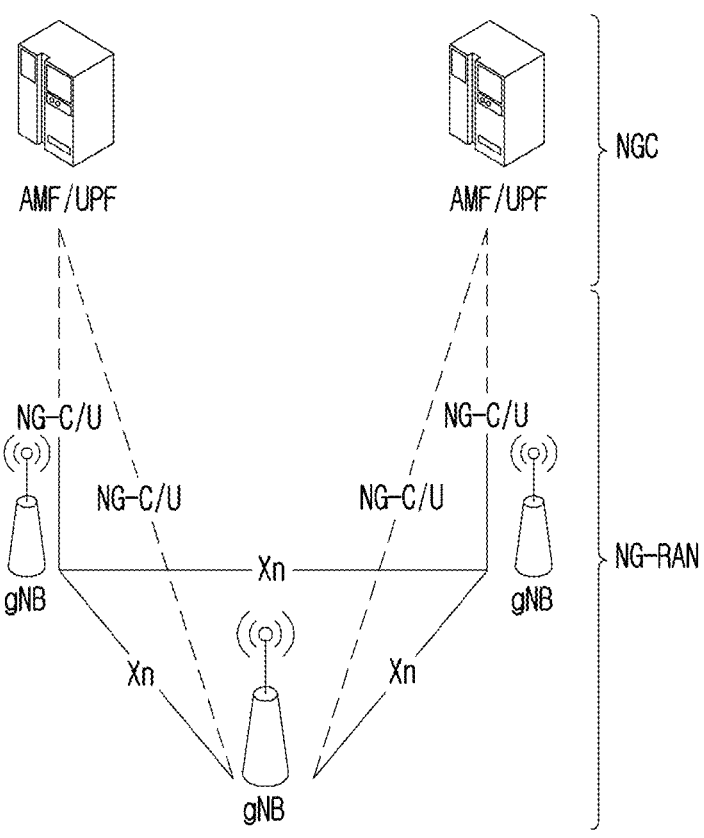
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from abase station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
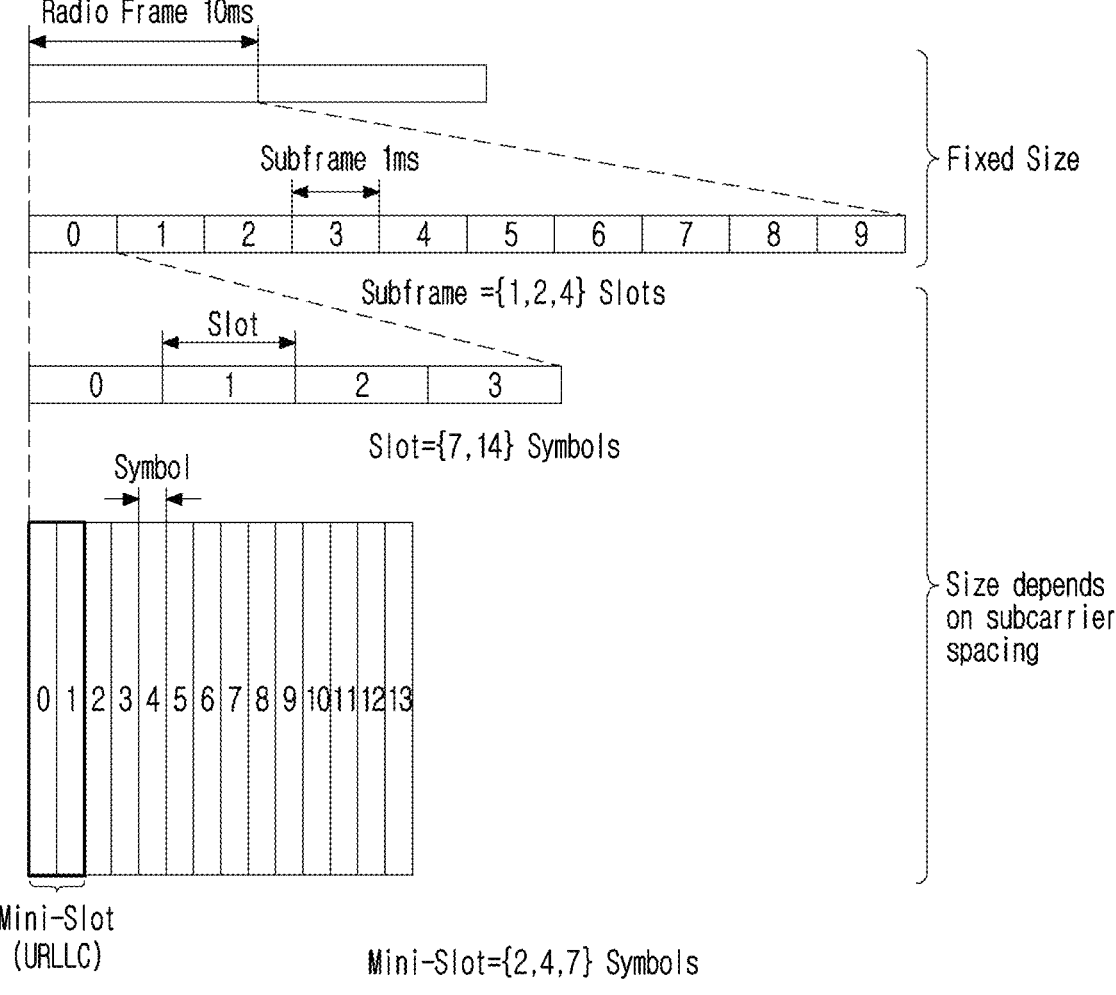
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is 480·103 Hz and $N_f$ is 4096. Downlink and uplink transmission is configured (organized) with a radio frame having a duration of $$T_f = 1/(\Delta f_{max} N_f/100) \cdot T_c = 10 \text{ ms}.$$

Here, a radio frame is configured with 10 subframes having a duration of $$T_{sf} = (\Delta f_{max} N_f/1000) \cdot T_c = 1 \text{ ms},$$

respectively. In this case, there may be one set of frames for an uplink and one set of frames for a downlink. In addition, transmission in an uplink frame No. i from a terminal should start earlier by $T_{TA} = (N_{TA} + N_{TA,offset})T_c$ than a corresponding downlink frame in a corresponding terminal starts. For a subcarrier spacing configuration p, slots are numbered in an increasing order of $$n_s^\mu \in \{0, \dots, N_{slot}^{subframe,\mu} - 1\}$$

in a subframe and are numbered in an increasing order of $$n_{s,f}^\mu \in \{0, \dots, N_{slot}^{subframe,\mu} - 1\}$$

in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $$n_s^\mu N_{symb}^{slot}$$

in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$) the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\,\mu}$ | $N_{slot}^{subframe,\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\,\mu}$ | $N_{slot}^{subframe,\,\mu}$ |
|---|---|---|---|
| 2 | 12 | 40 | 4 |

FIG. 2 is an example on $\mu=2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
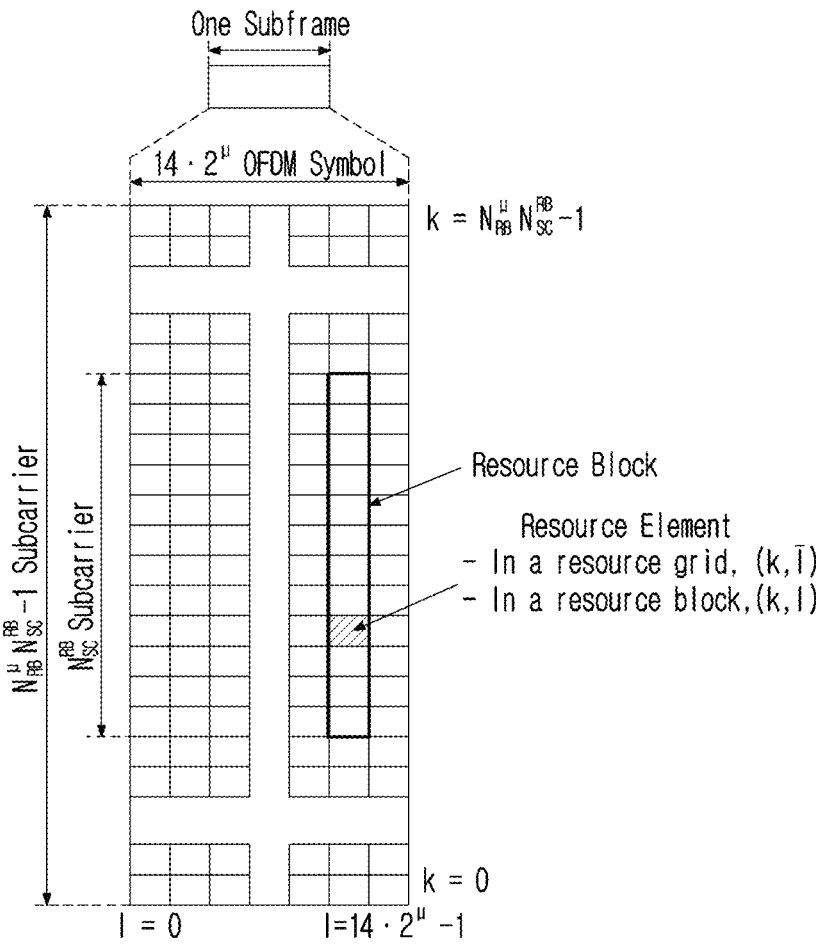
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $$N_{RB}^{\mu} N_{sc}^{RB}$$

subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \le N_{RB}^{max,\mu}$. The $N_{RB}^{max,\mu}$ represents a maximum transmission bandwidth, which may be different between an uplink and a downlink as well as between numerologies. In this case, one resource grid may be configured per $\mu$ and antenna port p. Each element of a resource grid for $\mu$ and an antenna port p is referred to as a resource element and is uniquely identified by an index pair (k,l'). Here, $k=0, \ldots, N_{RB}^{\mu} \le N_{sc}^{RB}-1$ is an index in a frequency domain and $$l' = 0, \ldots, 2^{\mu} N_{symb}^{(\mu)} - 1$$

refers to a position of a symbol in a subframe. When referring to a resource element in a slot, an index pair (k,l) is used. Here, $l=0, \ldots, N_{symb}^{\mu}-1$. A resource element (k,l') for p and an antenna port p corresponds to a complex value, $a_{k,l'}^{(p,\mu)}$. When there is no risk of confusion or when a specific antenna port or numerology is not specified, indexes p and $\mu$ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration $\mu$. The center of subcarrier 0 of common resource block 0 for a subcarrier spacing configuration $\mu$ is identical to 'point A'. A relationship between a common resource block number $n_{CRB}^{\mu}$ and a resource element (k,l) for a subcarrier spacing configuration $\mu$ in a frequency domain is given as in the following Equation 1.

$$n_{CRB}^{\mu} = \left\lfloor \frac{k}{N_{SC}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $$N_{BWP,i}^{size,\mu} - 1$$

in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
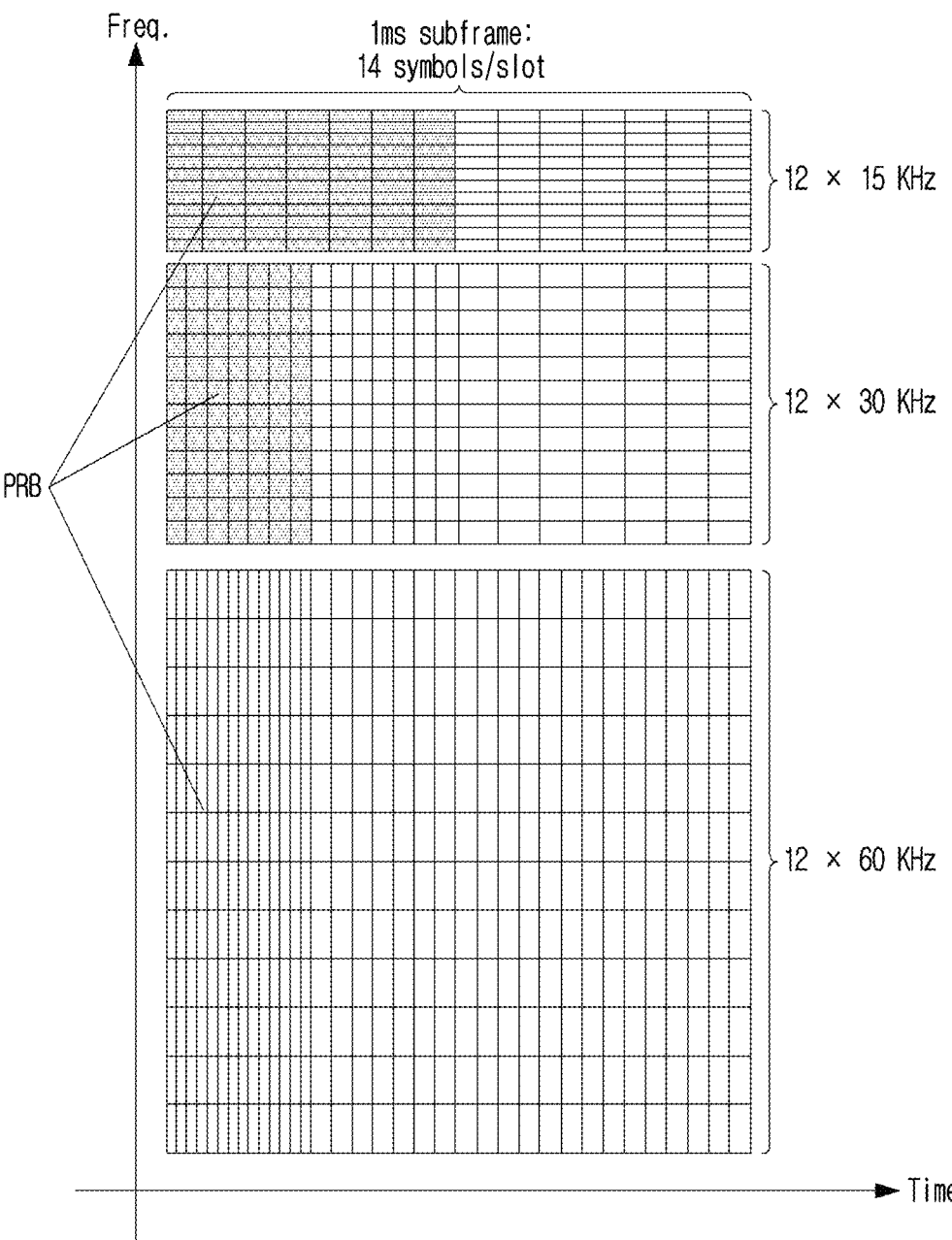
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
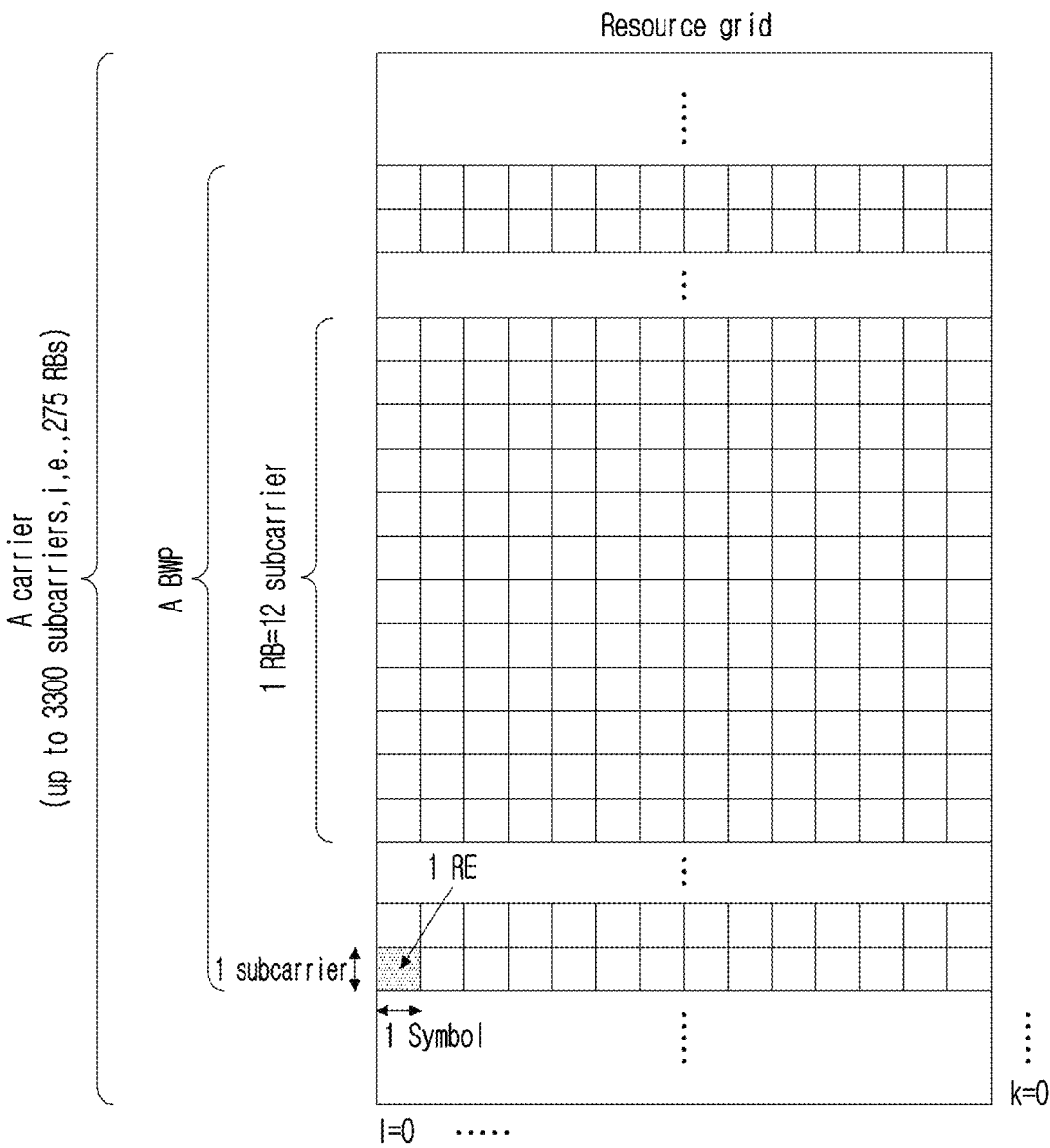
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a sub-carrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, abase station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
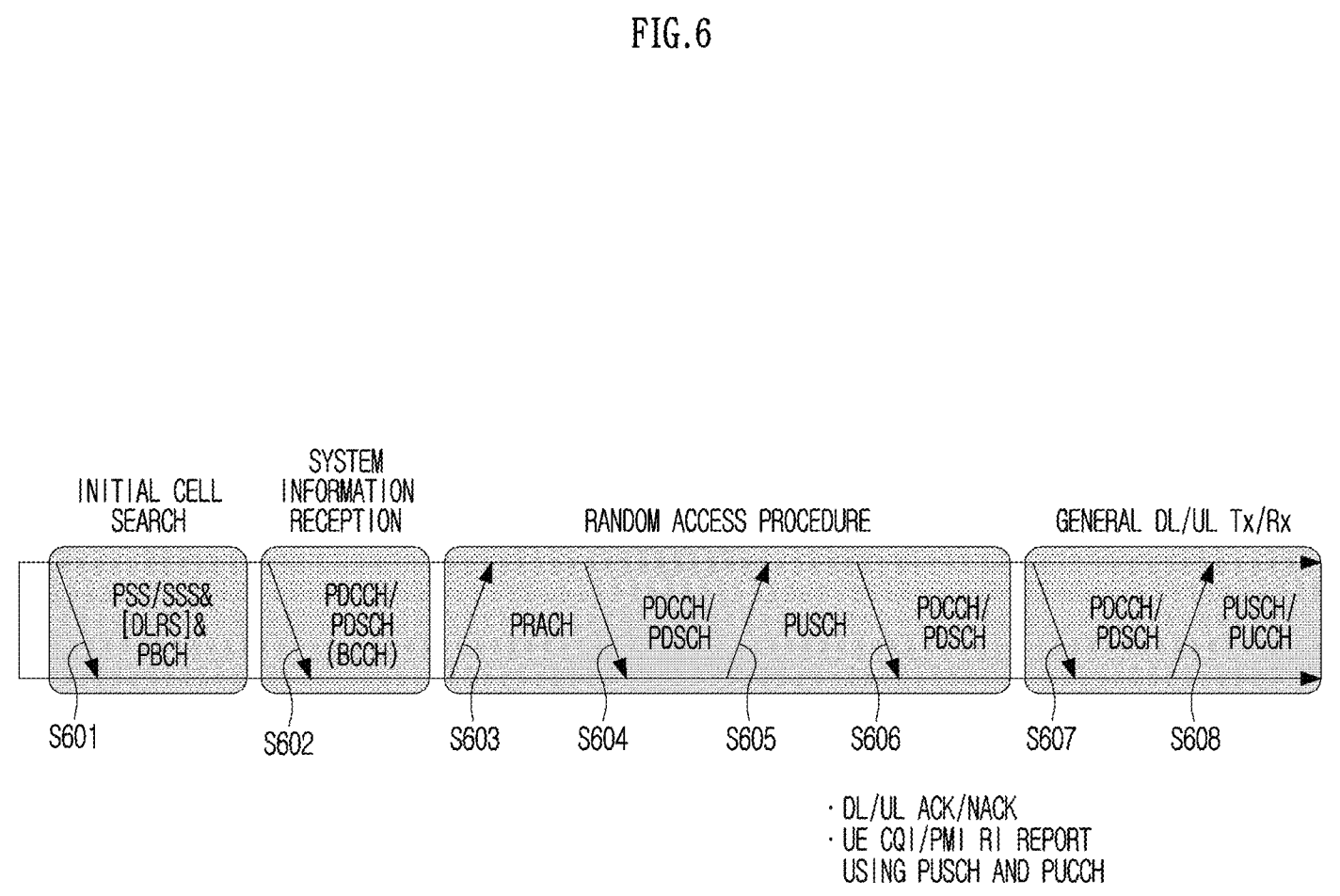

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/ PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Beam Management (BM)

As a BM procedure is L1 (layer 1)/L2 (layer 2) procedures for acquiring and maintaining a set of base station (e.g., gNB, TRP, etc.) and/or terminal (e.g., UE) beams which may be used to transmit/receive a downlink (DL) and an uplink (UL), it may include the following procedures and terms.

Beam measurement: An operation that a base station or UE measures a property of a received beamforming signal Beam determination: An operation that a base station or UE selects its Tx beam/Rx beam Beam sweeping: An operation of covering a spatial domain by using a Tx and/or Rx beam during a certain time interval in a predetermined manner Beam report: An operation that UE reports information of a beamformed signal based on beam measurement The BM procedure can be divided into (1) a DL BM procedure using a synchronization signal (SS)/physical broadcast channel (PBCH) block or CSI-RS, and (2) a UL BM procedure using a sounding reference signal (SRS).

In addition, each BM procedure may include Tx beam sweeping for determining a Tx Beam and Rx beam sweeping for determining a Rx beam.

Hereinafter, a DL BM procedure is described.

A DL BM procedure may include (1) transmission for beamformed DL RSs (reference signal) of a base station (e.g., a CSI-RS or a SS Block (SSB)) and (2) beam reporting of a terminal.

Here, beam reporting may include preferred DL RS ID (identifier)(s) and L1-RSRP (Reference Signal Received Power) corresponding to it.

The DL RS ID may be an SSBRI (SSB Resource Indicator) or a CRI (CSI-RS Resource Indicator).

Hereinafter, a DL BM procedure using an SSB is described.

Figure 7:
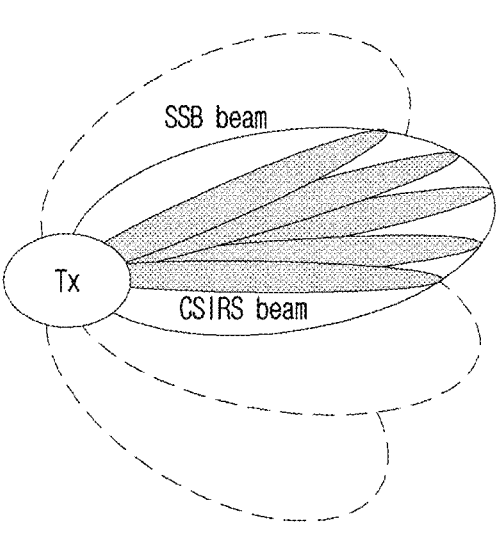
FIG. 7 is a diagram which illustrates a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, an SSB beam and a CSI-RS beam may be used for beam measurement. A measurement metric is L1-RSRP per resource/block. An SSB may be used for coarse beam measurement and a CSI-RS may be used for fine beam measurement. An SSB may be used for both Tx beam sweeping and Rx beam sweeping.

Rx beam sweeping using an SSB may be performed while UE changes an Rx beam for the same SSBRI across multiple SSB bursts. Here, one SS burst includes one or more SSBs and one SS burst set includes one or more SSB bursts.

Figure 8:
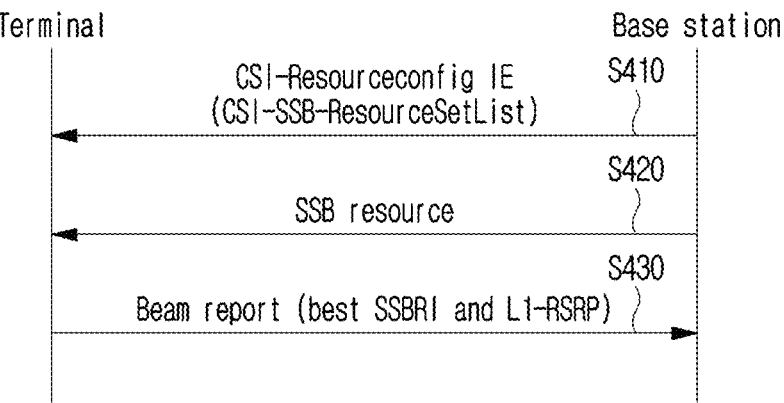
FIG. 8 is a diagram which illustrates a downlink beam management procedure using an SSB in a wireless communication system to which the present disclosure may be applied.

FIG. 8 is a diagram which illustrates a downlink beam management procedure using an SSB in a wireless communication system to which the present disclosure may be applied.

A configuration on beam report using an SSB is performed in a CSI/beam configuration in a RRC connected state (or a RRC connected mode).

In reference to FIG. 8, a terminal receives CSI-ResourceConfig IE including CSI-SSB-ResourceSetList including SSB resources used for BM from a base station S410.

Table 6 represents an example of CSI-ResourceConfig IE and as in Table 6, a BM configuration using an SSB configures an SSB like a CSI-RS resource without being separately defined.

TABLE 6

```
-- ASN1START
-- TAG-CSI-RESOURCECONFIG-START
CSI-ResourceConfig ::=          SEQUENCE {
    csi-ResourceConfigId        CSI-ResourceConfigId,
    csi-RS-ResourceSetList      CHOICE {
        nzp-CSI-RS-SSB              SEQUENCE {
            nzp-CSI-RS-ResourceSetList     SEQUENCE (SIZE
(1..maxNrofNZP-CSI-RS-ResourceSetsPerConfig)) OF
NZP-CSI-RS-ResourceSetId OPTIONAL,
            csi-SSB-ResourceSetList        SEQUENCE (SIZE
(1..maxNrofCSI-SSB-ResourceSetsPerConfig)) OF
CSI-SSB-ResourceSetId
        OPTIONAL
        },
        csi-IM-ResoruceSetList      SEQUENCE (SIZE
(1..maxNrofCSI-IM-ResourceSetsPerConfig)) OF CSI-IM-ResourceSetId
    },
    bwp-Id                      BWP-Id,
    resourceType                ENUMERATED { aperiodic,
semiPersistent, periodic },
    ...
}
-- TAG-CSI-RESOURCECONFIGTOADDMOD-STOP
-- ASN1STOP
```

In Table 6, a csi-SSB-ResourceSetList parameter represents a list of SSB resources used for beam management and reporting in one resource set. Here, an SSB resource set may be configured as {SSBx1, SSBx2, SSBx3, SSBx4, . . . }. An SSB index may be defined as 0 to 63.

A terminal receives an SSB resource from the base station based on the CSI-SSB-ResourceSetList S420.

When CSI-RS reportConfig related to report on SSBRI and L1-RSRP is configured, the terminal (beam) reports the best SSBRI and L1-RSRP corresponding to it to a base station S430.

Hereinafter, a DL BM procedure using a CSI-RS is described.

When usage of a CSI-RS is described, a CSI-RS is used for beam management i) when a repetition parameter is configured for a specific CSI-RS resource set and TRS_info is not configured. ii) When a repetition parameter is not configured and TRS_info is configured, a CSI-RS is used for a TRS (tracking reference signal). iii) When a repetition parameter is not configured and TRS_info is not configured, a CSI-RS is used for CSI acquisition.

Such a repetition parameter may be configured only for CSI-RS resource sets connected with CSI-ReportConfig having report of 'No Report (or None)' or L1 RSRP.

If a terminal is configured with CSI-ReportConfig that reportQuantity is configured as 'cri-RSRP' or 'none' and CSI-ResourceConfig (a higher layer parameter resources-ForChannelMeasurement) for channel measurement includes NZP-CSI-RS-ResourceSet that a higher layer parameter 'repetition' is configured without including a higher layer parameter 'trs-Info', the terminal may be configured only with ports with the same number (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted to a different OFDM symbol. In addition, a terminal does not expect to receive a different periodicity for periodicityAndOffset in all CSI-RS resources within NZP-CSI-RS-Resourceset.

On the other hand, when repetition is configured as 'OFF', it is related to a Tx beam sweeping procedure of a base station. In this case, when repetition is configured as 'OFF', a terminal does not assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and L1-RSRP corresponding to it to a base station.

And, when a CSI-RS resource is configured in the same OFDM symbol(s) as an SSB (an SS/PBCH Block) and 'QCL-TypeD' may be applied, the terminal may assume that a CSI-RS and an SSB are quasi co-located from a viewpoint of 'QCL-TypeD'.

Here, the QCL TypeD may mean that antenna ports are QCL-ed from a viewpoint of a spatial Rx parameter. When a terminal receives a plurality of DL antenna ports in a QCL Type D relationship, the same Rx beam may be applied. In addition, a terminal does not expect that a CSI-RS will be configured in a RE overlapped with an RE of an SSB.

Figure 9:
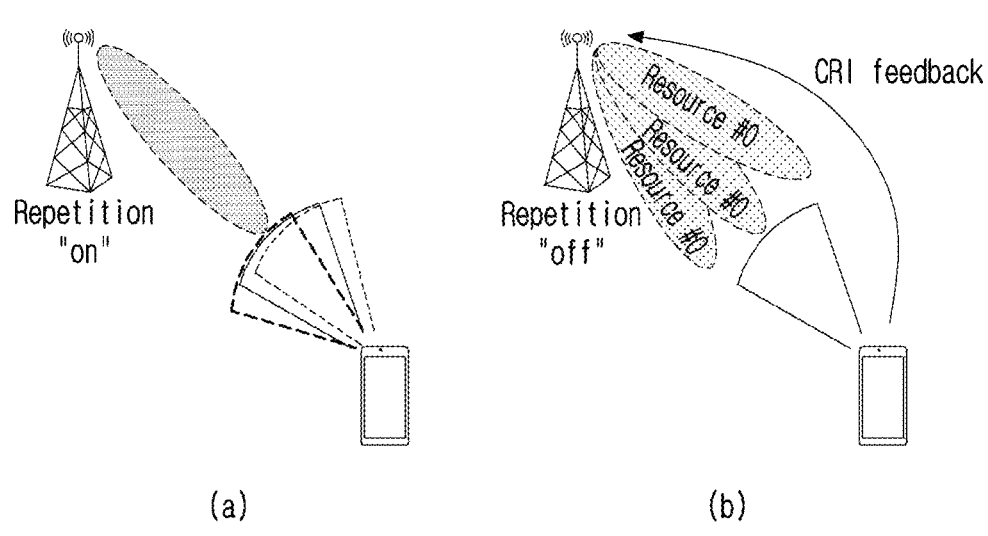
FIG. 9 is a diagram which illustrates a downlink beam management operation using a CSI-RS in a wireless communication system to which the present disclosure may be applied.

FIG. 9 is a diagram which illustrates a downlink beam management operation using a CSI-RS in a wireless communication system to which the present disclosure may be applied.

FIG. 9(*a*) represents a Rx beam determination (or refinement) procedure of a terminal and FIG. 9(*b*) represents a Tx beam sweeping procedure of a base station. In addition, FIG. 9(*a*) is a case in which a repetition parameter is configured as 'ON' and FIG. 9(*b*) is a case in which a repetition parameter is configured as 'OFF'.

Figure 10:
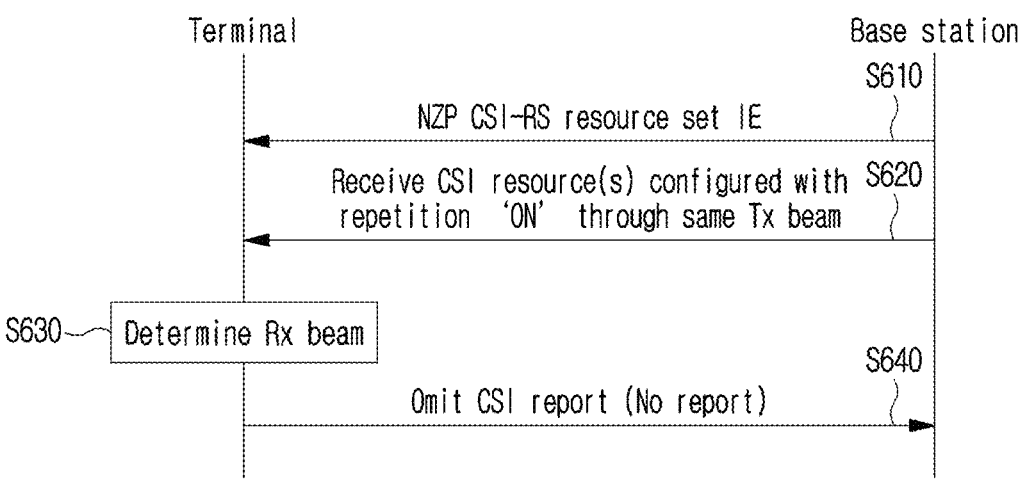
FIG. 10 is a diagram which illustrates an Rx beam determination process of a terminal in a wireless communication system to which the present disclosure may be applied.

FIG. 10 is a diagram which illustrates a Rx beam determination process of a terminal in a wireless communication system to which the present disclosure may be applied.

In reference to FIG. 9(*a*) and FIG. 10, a Rx beam determination process of a terminal is described.

A terminal receives a NZP CSI-RS resource set IE including a higher layer parameter repetition from a base station through RRC signaling S610. Here, the repetition parameter is configured as 'ON'.

A terminal repetitively receives resource(s) in a CSI-RS resource set configured as repetition 'ON' through the same Tx beam (or DL spatial domain transmission filter) of a base station in a different OFDM symbol S620.

A terminal determines its Rx beam S630.

A terminal omits CSI reporting S640. In this case, reportQuantity of a CSI reporting configuration may be configured as 'No report (or None).

In other words, the terminal may omit CSI reporting when it is configured as repetition 'ON'.

Figure 11:
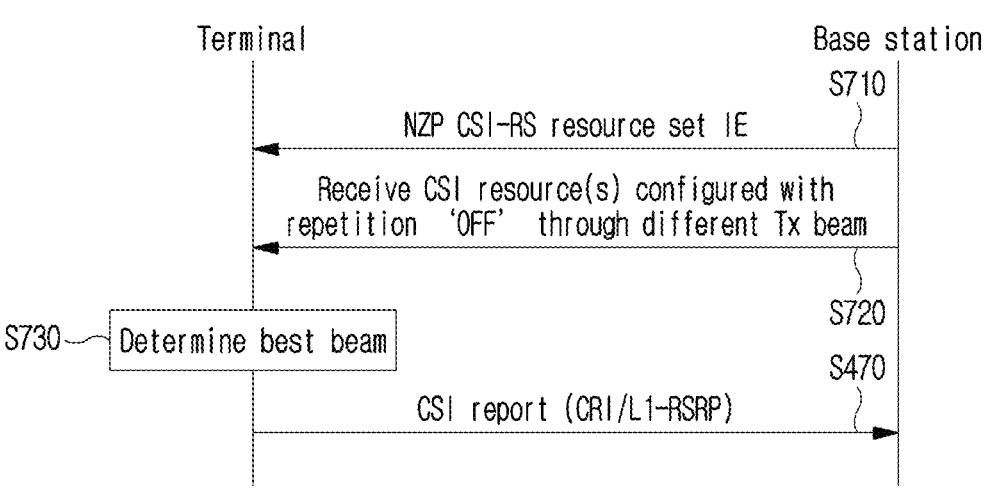
FIG. 11 is a diagram which illustrates a Tx beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9(*b*) and FIG. 11, a Tx beam determination process of a base station is described.

A terminal receives a NZP CSI-RS resource set IE including a higher layer parameter repetition from a base station through RRC signaling S710. Here, the repetition parameter is configured as 'OFF' and is related to a Tx beam sweeping procedure of a base station.

A terminal receives resource(s) in a CSI-RS resource set configured as repetition 'OFF' through a different Tx beam (DL spatial domain transmission filter) of a base station S720.

A terminal selects (or determines) the best beam S740.

A terminal reports an ID on a selected beam and relative quality information (e.g., L1-RSRP) to a base station S740. In this case, reportQuantity of a CSI reporting configuration may be configured as 'a CRI+L1-RSRP'.

In other words, when a CSI-RS is transmitted for BM, the terminal reports a CRI and L1-RSRP regarding it to a base station.

Figure 12:
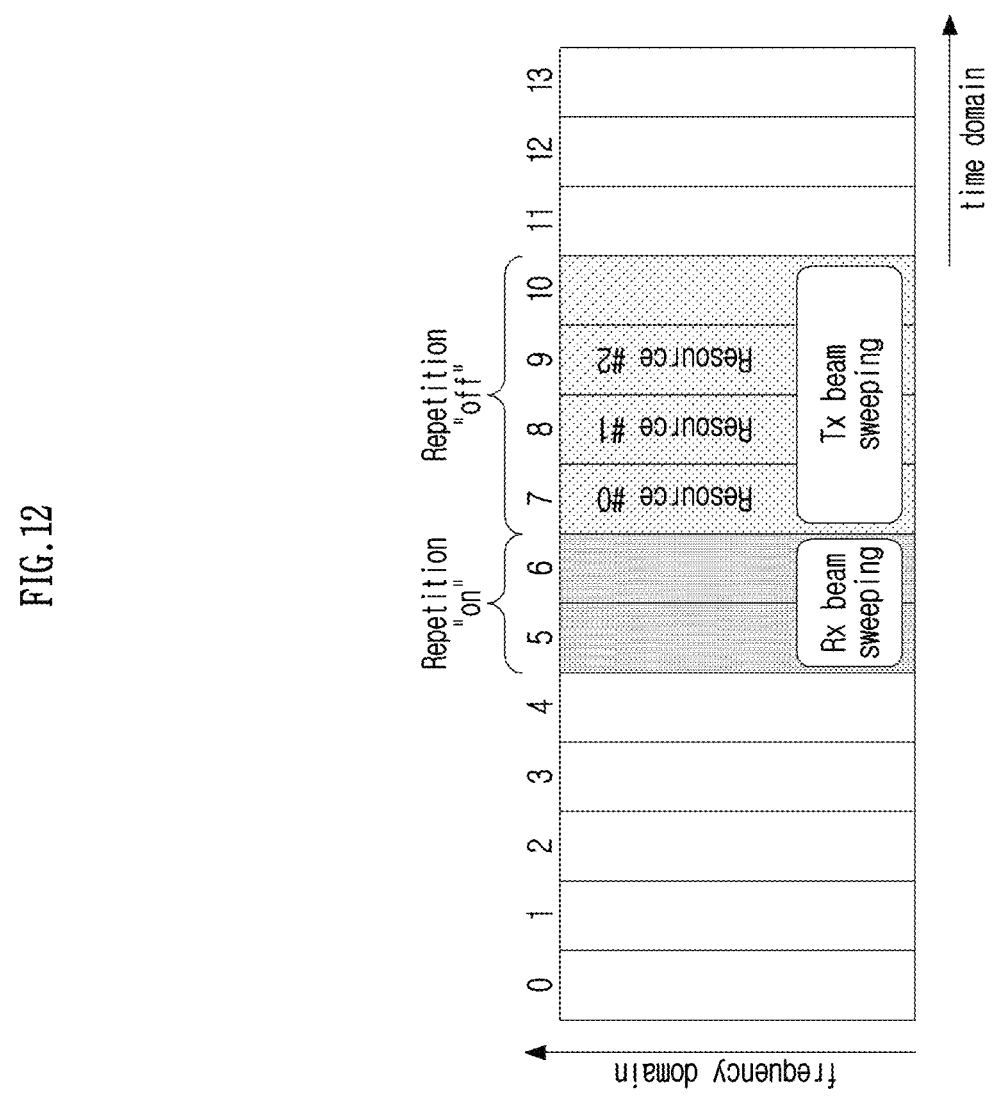

FIG. 12 is a diagram which illustrates resource allocation in a time and frequency domain related to a downlink beam management operation in a wireless communication system to which the present disclosure may be applied.

In reference to FIG. 12, it may be seen that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted by a different Tx beam.

Hereinafter, a downlink BM related beam indication method is described.

A terminal may receive a RRC configuration for a list on up to M candidate transmission configuration indication (TCI) states at least for a purpose of a QCL (Quasi Co-location) indication. Here, M may be 64.

Each TCI state may be configured as one RS set. Each ID of a DL RS for a spatial QCL purpose (QCL Type D) at least in a RS set may refer to one of DL RS types such as an SSB, a P (periodic)-CSI RS, a SP (semi-persistent)-CSI RS, an a (aperiodic)-CSI RS, etc.

An ID of DL RS(s) in a RS set used at least for a spatial QCL purpose may be initialized/updated at least through explicit signaling.

Table 7 illustrates a TCI-State information element (IE).

A TCI-State IE is associated with a quasi co-location (QCL) type corresponding to one or two DL reference signals (RS).

TABLE 7

```
-- ASN1START
-- TAG-TCI-STATE-START
TCI-State ::=          SEQUENCE {
   tci-StateId           TCI-StateId,
   qcl-Type1             QCL-Info,
   qcl-Type2             QCL-Info
       OPTIONAL,  -- Need R
   ...
}
QCL-Info ::=          SEQUENCE {
   cell                  ServCellIndex
       OPTIONAL,  -- Need R
   bwp-Id                BWP-Id
          OPTIONAL, -- Cond CSI-RS-Indicated
   referenceSignal    CHOICE {
       csi-rs                NZP-CSI-RS-ResourceId,
       ssb                   SSB-Index
   },
   qcl-Type           ENUMERATED {typeA, typeB, type C, typeD},
   ...
}
-- TAG-TCI-STATE-STOP
-- ASN1STOP
```

In Table 7, a bwp-Id parameter represents a DL BWP (bandwidth part) where a RS is positioned, a cell parameter represents a carrier where a RS is positioned and a referencesignal parameter represents reference antenna port(s) which become a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated to NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s).

Multi Panel Operations

'A panel' referred to in the present disclosure may be interpreted/applied as 'a plurality of (or at least one) panels' or 'a panel group' (having a similarity/a common value from a viewpoint of a specific characteristic (e.g., timing advance (TA), a power control parameter, etc.)). Alternatively, 'a panel' referred to in the present disclosure may be interpreted/applied as 'a plurality of (or at least one) antenna ports' or 'a plurality of (or at least one) uplink resources' or 'an antenna port group' or 'an uplink resource group (or set)' (having a similarity/a common value from a viewpoint of a specific characteristic (e.g., TA, a power control parameter, etc.)). Alternatively, 'a panel' referred to in the present disclosure may be interpreted/applied as 'a plurality of (or at least one) beams' or 'at least one beam group (or set)' (having a similarity/a common value from a viewpoint of a specific characteristic (e.g., TA, a power control parameter, etc.)). Alternatively, 'a panel' referred to in the present disclosure may be defined as a unit for a terminal to configure a transmission/reception beam. For example, 'a transmission panel' may generate a plurality of candidate transmission beams in one panel, but it may be defined as a unit which may use only one beam of them in transmission at a specific time. In other words, only one transmission beam (spatial relation information RS) may be used per Tx panel to transmit a specific uplink signal/channel. In addition, 'a panel' in the present disclosure may refer to 'a plurality of (or at least one) antenna ports' or 'an antenna port group' or 'an uplink resource group (or set)' with common/similar uplink synchronization and may be interpreted/applied as an expression which is generalized as 'an uplink synchronization unit (USU)'. In addition, 'a panel' in the present disclosure may be interpreted/applied as an expression which is generalized as 'an uplink transmission entity (UTE)'.

In addition, the 'uplink resource (or resource group)' may be interpreted/applied as a PUSCH/PUCCH/SRS/PRACH resource (or resource group (or set)). In addition, the interpretation/application may be interpreted/applied conversely. In addition, 'an antenna (or an antenna port)' may represent a physical or logical antenna (or antenna port) in the present disclosure.

In other words, 'a panel' referred to in the present disclosure may be variously interpreted as 'a terminal antenna element group', 'a terminal antenna port group', 'a terminal logical antenna group', etc. In addition, for which physical/logical antennas or antenna ports will be combined and mapped to one panel, a variety of schemes may be considered by considering a position/a distance/a correlation between antennas, a RF configuration, and/or an antenna (port) virtualization scheme, etc. Such a mapping process may be changed according to terminal implementation. In addition, 'a panel' referred to in the present disclosure may be interpreted/applied as 'a plurality of panels' or 'a panel group' (having a similarity from a viewpoint of a specific characteristic).

Hereinafter, multi-panel structures will be described.

Terminal modeling which installs a plurality of panels (e.g., configured with one or a plurality of antennas) in terminal implementation in a high-frequency band (e.g., bi-directional two panels in 3GPP UE antenna modeling). A variety of forms may be considered in implementing a plurality of panels of such a terminal. Contents described below are described based on a terminal which supports a plurality of panels, but they may be extended and applied to a base station (e.g., a TRP) which supports a plurality of panels. The after-described contents related to multi-panel structures may be applied to transmission and reception of a signal and/or a channel considering multi panels described in the present disclosure.

FIG. 13 is a diagram illustrating multi panel terminals in a wireless communication system to which the present disclosure may be applied.

FIG. 13(a) illustrates implementation of RF (radio frequency) switch-based multi panel terminals and FIG. 13(b) illustrates implementation of RF connection-based multi panel terminals.

For example, it may be implemented based on a RF switch as in FIG. 13(a). In this case, only one panel is activated for a moment and it may be impossible to transmit a signal for a certain duration of time to change an activated panel (i.e., panel switching).

For implementation of a plurality of panels in a different way, a RF chain may be connected respectively so that each panel can be activated anytime as in FIG. 13(b). In this case, time for panel switching may be 0 or too little. And, it may be possible to simultaneously transmit a signal by activating a plurality of panels at the same time (STxMP: simultaneous transmission across multi-panel) according to a model and power amplifier configuration.

For a terminal having a plurality of panels, a radio channel state may be different per panel, and in addition, a RF/antenna configuration may be different per panel, so a method in which a channel is estimated per panel is needed. In particular, a process in which one or a plurality of SRS resources are transmitted respectively per panel is needed to measure uplink quality or manage an uplink beam, or to measure downlink quality per panel or manage a downlink beam by utilizing channel reciprocity. Here, a plurality of SRS resources may be SRS resources which are transmitted by a different beam in one panel or may be SRS resources which are repeatedly transmitted by the same beam. Hereinafter, for convenience, a set of SRS resources transmitted in the same panel (a specific usage parameter (e.g., beam management, antenna switching, a codebook-based PUSCH, a non-codebook based PUSCH) and a specific time domain behavior (e.g., aperiodic, semi-persistent, or periodic)) may be referred to as an SRS resource group. For this SRS resource group, an SRS resource set configuration supported in a Rel-15 NR system may be utilized as it is or it may be configured separately by bundling one or a plurality of SRS resources (having the same time domain behavior and usage).

For reference, only when usage is beam management for the same usage and time domain behavior in Rel-15, a plurality of SRS resource sets may be configured. In addition, it is defined so that simultaneous transmission cannot be performed between SRS resources configured in the same SRS resource set, but simultaneous transmission can be performed between SRS resources belonging to a different SRS resource set. Accordingly, if panel implementation and simultaneous transmission of a plurality of panels as in FIG. 13(b) are considered, a corresponding concept (an SRS resource set) itself may be matched to an SRS resource group. But, an SRS resource group may be separately defined if even implementation (panel switching) as in FIG. 113(a) is considered. In an example, a configuration may be given by giving a specific ID to each SRS resource so that resources with the same ID belong to the same SRS resource group and resources with a different ID belong to a different resource group.

For example, it is assumed that 4 SRS resource sets configured for BM usage (RRC parameter usage is configured as 'BeamManagement') are configured to a UE. Hereinafter, for convenience, each is referred to as SRS resource set A, B, C, D. In addition, a situation is considered which applies implementation performing SRS transmission by corresponding each of the sets to one (Tx) panel because UE implements a total of 4 (Tx) Panels.

TABLE 8

| The maximum number of SRS resource sets across all time domain behaviors (periodic/semi-persistent/aperiodic) reported in 2-30 | Additional limit to the maximum number of the maximum SRS resource sets per supported time domain behavior (periodic/semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

In Rel-15 standards, such UE implementation is more clearly supported by the following agreement. In other words, for a UE which performs capability reporting for a value reported in feature group (FG) 2-30 as 7 or 8 in Table 8, a total of up to 4 SRS resource sets for BM (per supported time domain behavior) may be configured as in the right column of Table 6. As above, implementation which performs transmission by corresponding one UE panel to each set may be applied.

Here, when 4 panel UE corresponds each panel to one SRS resource set for BM and transmits it, the number itself of configurable SRS resources per each set is also supported by separate UE capability signaling. For example, it is assumed that 2 SRS resources are configured in the each set. It may correspond to 'the number of UL beams' which may be transmitted per panel. In other words, the UE may respectively correspond 2 UL beams to 2 configured SRS resources per each panel and transmit them when 4 panels are implemented. In this situation, according to Rel-15 standards, one of a codebook (CB)-based UL or non-codebook (NCB)-based UL mode may be configured for final UL PUSCH transmission scheduling. In any case, only one SRS resource set (having usage set as "CB-based UL" or "NCB-based UL") configuration, i.e., only one dedicated SRS resource set (for a PUSCH) configuration, is supported in Rel-15 standards.

Hereinafter, multi panel UE (MPUE) categories will be described.

Regarding the above-described multi panel operations, the following 3 MPUE categories may be considered. Specifically, 3 MPUE categories may be classified according to i) whether multiple panels may be activated and/or ii) transmission using multiple panels may be possible.

i) MPUE category 1: In a terminal that multiple panels are implemented, only one panel may be activated at a time. A delay for panel switching/activation may be configured as [X]ms. In an example, the delay may be configured to be longer than a delay for beam switching/activation and may be configured in a unit of a symbol or in a unit of a slot. MPUE category 1 may correspond to MPUE-assumption1 described in standardization-related documents (e.g., a 3gpp agreement, a technical report (TR) document and/or a technical specification (TS) document, etc.).

ii) MPUE category 2: In a terminal that multiple panels are implemented, multiple panels may be activated at a time. One or more panels may be used for transmission. In other words, simultaneous transmission using panels may be performed in a corresponding category. MPUE category 2 may correspond to MPUE-assumption2 described in standardization-related documents (e.g., a 3gpp agreement, a TR document and/or a TS document, etc.).

iii) MPUE category 3: In a terminal that multiple panels are implemented, multiple panels may be activated at a time, but only one panel may be used for transmission. MPUE category 3 may correspond to MPUE-assumption3 described in standardization-related documents (e.g., a 3gpp agreement, a TR document and/or a TS document, etc.).

Regarding multi panel-based signal and/or channel transmission and reception suggested in the present disclosure, at least one of the above-described 3 MPUE categories may be supported. In an example, in Rel-16, MPUE category 3 of the following 3 MPUE categories may be (selectively) supported.

In addition, information on a MPUE category may be predefined in specifications (i.e., standards). Alternatively, information on a MPUE category may be configured semistatically and/or may be indicated dynamically according to a system situation (i.e., a network aspect, a terminal aspect). In this case, a configuration/an indication, etc. related to multi panel-based signal and/or channel transmission and reception may be configured/indicated by considering a MPUE category.

Hereinafter, a configuration/an indication related to panel-specific transmission/reception will be described.

Regarding a multi panel-based operation, signal and/or channel transmission and reception may be performed in a panel-specific way. Here, being panel-specific may mean that signal and/or channel transmission and reception in a unit of a panel may be performed. Panel-specific transmission and reception may be referred to as panel-selective transmission and reception.

Regarding panel-specific transmission and reception in a multi panel-based operation suggested in the present disclosure, a method of using identification information (e.g., an identifier (ID), an indicator, etc.) for configuring and/or indicating a panel which will be used for transmission and reception among one or more panels may be considered.

In an example, an ID for a panel may be used for panel-selective transmission of a PUSCH, a PUCCH, an SRS, and/or a PRACH among activated multiple panels. The ID may be configured/defined based on at least any one of the following 4 methods (options (Alts) 1, 2, 3, 4).

i) Alt.1: An ID for a panel may be an SRS resource set ID.

In an example, it may be desirable to correspond each UE Tx panel to an SRS resource set configured in terms of terminal implementation when considering a) an aspect that SRS resources of multiple SRS resource sets having the same time domain behavior are simultaneously transmitted in the same BWP, b) an aspect that a power control parameter is configured in a unit of an SRS resource set, c) an aspect that a terminal may report up to 4 SRS resource sets (they may correspond to up to 4 panels) according to a supported time domain behavior. In addition, an Alt.1 scheme has an advantage that an SRS resource set related to each panel may be used for 'codebook' and 'non-codebook'-based PUSCH transmission. In addition, for an Alt.1 scheme, multiple SRS resources belonging to multiple SRS resource sets may be selected by extending an SRI (SRS resource indicator) field of DCI. In addition, a mapping table of an SRI to SRS resource may need to be extended to include SRS resources in the whole SRS resource set.

ii) Alt.2: An ID for a panel may be an ID which is (directly) associated with a reference RS resource and/or a reference RS resource set.

ii) Alt.3: An ID for a panel may be an ID which is directly associated with a target RS resource (a reference RS resource) and/or a reference RS resource set.

An Alt.3 scheme has an advantage that configured SRS resource set(s) corresponding to one UE Tx panel may be controlled more easily and that the same panel identifier may be allocated to multiple SRS resource sets having a different time domain behavior.

iv) Alt.4: An ID for a panel may be an ID which is additionally configured to spatial relation information (e.g., RRC_SpatialRelationInfo).

An Alt.4 scheme may be a scheme which newly adds information for representing an ID for a panel. In this case, it has an advantage that configured SRS resource sets corresponding to one UE Tx panel may be controlled more easily and that the same panel identifier may be allocated to multiple SRS resource sets having a different time domain behavior.

In an example, a method of introducing an UL TCI similarly to the existing DL TCI (Transmission Configuration Indication) may be considered. Specifically, definition of a UL TCI state may include a list of reference RS resources (e.g., an SRS, a CSI-RS and/or an SSB). A current SRI field may be reused to select a UL TCI state from a configured set or a new DCI field of DCI format 0_1 (e.g., a UL-TCI field) may be defined for a corresponding purpose.

Information related to the above-described panel-specific transmission and reception (e.g., a panel ID, etc.) may be transmitted by higher layer signaling (e.g., a RRC message, MAC-CE, etc.) and/or lower layer signaling (e.g., layer1 (L1: Layer1) signaling, DCI, etc.). Corresponding information may be transmitted from a base station to a terminal or may be transmitted from a terminal to a base station according to a situation or if necessary.

In addition, corresponding information may be configured by a hierarchical method which configures a set for a candidate group and indicates specific information.

In addition, the above-described identification information related to a panel may be configured in a unit of a single panel or in a unit of multiple panels (e.g., a panel group, a panel set).

Method for Transmitting and Receiving Channel State Information (CSI)

The contents discussed above can be applied in combination with the methods proposed in the present disclosure, which will be described later, or can be supplemented to clarify the technical characteristics of the methods proposed in the present disclosure. The methods described below are divided for convenience of explanation, and some components of one method may be replaced with some components of another method, or may be applied in combination with each other.

In NR Rel-15/Rel-16, the UE's CSI/beam measurement and/or CSI/beam reporting procedures are defined for CSI reporting (or beam reporting) operation between a base station and a UE.

Channel state information (CSI) may include information related to beam reporting (e.g., DL RS resource index (CRI, SSBRI), L1-RSRP, L1-SINR). However, in the present disclosure, when CSI reporting and beam reporting are referred to separately, information reported according to a CSI reporting operation may be interpreted to mean information excluding information related to beam reporting from information that can be included in the CSI.

For CSI/L1-RSRP/L1-SINR measurement of DL RS (CSI-RS/SSB), a specific CSI-RS resource set(s) or/and CSI-SSB resource set(s) may be configured for a UE. The CSI-RS resource set(s) or/and CSI-SSB resource set(s) may be configured/connected in a specific CSI resource setting (RRC IE CSI-ResourceConfig). And the CSI resource setting is configured/connected/related to a specific CSI reporting setting (RRC IE CSI-ReportConfig). Based on this, CSI-related quantities, L1-RSRP-related quantities, or L1-SINR-related quantities may be reported by a UE according to reportQuantity of a corresponding CSI reporting setting.

The CSI/beam measurement and reporting operation described above is an operation mainly used in S-TRP transmission and reception, and a CSI/beam reporting operation for M-TRP transmission and reception needs to be supported.

In particular, in the Rel-17 NR FeMIMO standardization, it was agreed to proceed with beam reporting enhancement for simultaneous M-TRP transmission with multi-panel reception. For simultaneous M-TRP transmission with multi-panel reception between a base station and a UE, a UE needs to report to a base station a CMR (DL RS or/and DL beam) combination that can be simultaneously received from different TRPs.

Rel-15 group-based beam reporting exists as a beam reporting method that has this simultaneous reception CMR combination report function. In the case of the Rel-15 group-based beam reporting, if the groupBasedBeamReporting parameter in each CSI-ReportConfig is 'enabled', two simultaneously receivable CMRs are reported when beam reporting through the corresponding CSI-ReportConfig.

However, from two simultaneously receivable CMRs reported through group-based beam reporting, it cannot be determined whether corresponding CMRs are CMRs from S-TRP or M-TRP. This is because, when measuring corresponding CMRs, a UE reports the CMRs determined based only on whether simultaneous reception is possible without confirming whether the CMRs are CMRs from an S-TRP or CMRs from different M-TRPs.

Through the above-described group-based beam reporting, only the best CMR pair that can be simultaneously received is reported, but there is a problem that beam reporting for M-TRP purposes is not always performed.

The following describes methods for solving the above-mentioned problems.

Table 9 below summarizes the agreements related to M-TRP beam measurement and reporting.

TABLE 9

@RAN1 #102e
Agreement
For L1-RSRP, consider measurement / reporting enhancement to facilitate inter-TRP beam pairing
   1) Option-1: Group-based reporting,
      a) e.g., beam restriction to facilitate inter-TRP pairing.
   2) Option-2: Non-group-based reporting
Agreement
Evaluate and study at least but not limited to the following issues for multi-beam enhancement
   1) Issue 1: Consideration of inter-beam interference
   2) Issue 2: For group-based reporting, increased number of groups and/or beams per group
   3) Issue 3: UE Rx panel related beam measurement/report
      a) NOTE: "UE panel" is used for discussion purpose only
@RAN1 #103e
Agreement
Down-select at least one of the following options for beam measurement/reporting enhancement to facilitate inter-TRP beam pairing in RAN1 #104-e TABLE 9-continued 1) Option 1: In a CSI-report, UE can report N>1 pair/groups and M>=1 beams
per pair/group
    a) Different beams in different pairs/groups can be received simultaneously
    b) FFS: whether M is equal or can be different across different pair/group
2) Option 2: In a CSI-report, UE can report N(N>=1) pairs/groups and M (M>1) beams
per pair/group
    a) Different beams within a pair/group can be received simultaneously
3) Option 3: UE report M(M>=1) beams in N (N>1) CSI-reports corresponding
to N report setting
    a) Different beams in different CSI-reports can be received simultaneously
    b) FFS: whether/how to introduce an association between different CSI-reports
    c) FFS: whether/how to differentiate reported measurements for beams that are received
simultaneously vs. beams that are not received simultaneously
       i) Whether/how to introduce an indication along with the CSI-reports to indicate
whether the beams in different CSI-reports can be received simultaneously
4) FFS: value of N and M in each option
5) FFS: Association between different beams in above options and different TRP/UE
panels
6) FFS: Identify new use cases per option compared with R16 (including backhaul)
7) FFS: whether different beams in different pairs/groups/reports can be received by same
spatial filter per option In the Rel-17 NR FeMIMO standardization, Option 1 to Option 3 were discussed as a beam reporting enhancement method for simultaneous M-TRP transmission with multi-panel reception as described above.

Option 1 and Option 2 are enhancement methods based on group-based beam reporting, and Option 3 is an enhancement method based on non-group-based beam reporting.

According to Option 1, the following operation/configuration is performed.

CMRs from different reporting groups reported by a UE are composed of CMRs that can be simultaneously received. If beam reporting for M-TRPs is performed, a specific group may mean a specific TRP (different groups mean different TRPs). That is, during beam reporting for M-TRPs, each group can be interpreted as corresponding to each TRP.

According to Option 2, the following operation/configuration is performed.

CMRs within a specific reporting group reported by a UE are composed of CMRs that can be simultaneously received. If beam reporting for M-TRPs is performed, a group may include CMR pairs from different TRPs. If N groups are reported, this may mean that N best pairs (i.e., best beam pairs) are reported.

According to Option 3, the following operation/configuration is performed.

This method is performed targeting a specific scenario (mainly, non-ideal backhaul scenario). According to this method, different reporting settings can be connected/related. CMRs reported from different report settings (CSI-ReportConfig IE) may be CMRs that can be received simultaneously or CMRs that cannot be received simultaneously (different CSI-ReportConfigs mean different TRPs). In other words, CSI-ReportConfig, a parameter indicating a reporting setting, can be interpreted as corresponding to a TRP. Accordingly, each of a plurality of reporting settings (CSI-ReportConfig) may correspond to each TRP among a plurality of TRPs.

In terms of beam measurement performed before beam reporting of a UE, TRP differentiation should be done first to determine which TRP the CMRs configured by a base station are from, however the present application mainly proposes a UE beam reporting method for M-TRP transmission and reception.

Based on the above background, the present disclosure proposes a beam measurement and reporting method for a UE for M-TRP downlink transmission of a base station, and operations (embodiments) related thereto.

In the present disclosure, '/' can be interpreted as 'and', 'or', or 'and/or' depending on the context.

Proposals 1 to 3 below disclosure methods that can be applied to at least one of candidate Options (Options 1 to 3) for beam reporting enhancement for simultaneous M-TRP transmission with multi-panel reception. For convenience of explanation in the embodiments described later, the description is based on that a specific option (e.g., Option 2) among Options 1 to 3 is assumed. This does not necessarily mean that the application of the corresponding embodiment is limited to the specific Option and each embodiment may also be applied to other Option(s).

[Proposal 1]

In relation to Option 2 (improvement method based on group-based beam reporting), the concept of group quantity may be defined/configured for each reporting group. Based on the group quantity, the following operations can be considered.

In group-based beam reporting, a base station can configure information indicating a type/characteristic of reported information (report subject) as a group quantity.

According to the group-based beam reporting operation, a UE may additionally report information indicating a type/characteristic of reported information (in addition to a type/characteristic configured by a base station) in a group quantity.

The term group quantity is a term defined for convenience of explanation, and is not intended to limit the technical idea according to this embodiment to the corresponding term group quantity. In other words, a group quantity can be interpreted as a parameter/concept/information that represents/limits a reporting subject (a type/characteristic of reported information) during group-based beam reporting. Here, the reporting subject may mean CMR(s) reported by a UE.

Hereinafter, the expression that a group quantity includes/represents specific information can be interpreted as follows.

i) A group quantity is configured to report subject(s) based on specific criteria (e.g., type/characteristics).

ii) A reporting subject for a group-based beam reporting operation is limited/configured to reporting subject(s) based on specific criteria.

In a reporting group, a UE can report M CMRs in a group according to a group quantity definition/configuration of a group. Alternatively, a UE may additionally report a group quantity for each group in reporting for each group within beam reporting.

The group quantity is information on CMRs in a reporting group reported by a UE based on Option 2, and may include at least one of the following i) or ii).

i) Information on whether CMRs (e.g., M CMRs) are CMRs that can be simultaneously received ii) Information on whether the CMRs in the group are CMRs from an S-TRP or CMRs from M-TRPs For example, the group quantity may be configured to include/indicate information on at least one of the following 1) to 4).

1) CMR combination configuration from an S-TRP that cannot be simultaneously received (or has no restrictions on simultaneous reception)

2) CMR combination configuration from an S-TRP capable of simultaneous reception 3) CMR combination configuration from M-TRPs that cannot be simultaneously received (or has no restrictions on simultaneous reception)

4) CMR combination configuration from M-TRPs capable of simultaneous reception

Specifically, when a UE performs group-based beam reporting (Rel-17 group based beam reporting), the following operations may be assumed.

A group quantity defined/configured in a specific reporting group by a base station may be configured to report CMRs that can be simultaneously received from M-TRPs (i.e., a group quantity is configured to CMRs that can be simultaneously received from M-TRPs). Accordingly, when reporting M CMR combinations through a corresponding group, a UE may need to perform group-based reporting with CMR combinations that can be simultaneously received from different TRPs. Or/and, when group-based beam reporting, a UE may also need to report group quantity information as above.

Additionally, another example of a group quantity may include information on whether a UE receives CMRs in the reporting group through the same Rx panel or through different Rx panels. As an example, a group quantity can be configured to CMRs received on the same Rx panel or CMRs received on different Rx panels.

For example, in a beam reporting operation (based on Option 2) of a UE according to a configuration/indication of a base station, when a UE reports 2 groups, but 2 beams within a group are reported for each group, the following groups can be assumed.

Group 1 may be a CMR combination configuration in which a group quantity can be simultaneously received without distinction of S-TRP/M-TRPs, and Group 2 may be a CMR combination configuration in which a group quantity can be simultaneously received from M-TRPs. Here, it can be assumed that CMR 1, 2, 3, and 4 are configure for a UE reporting the corresponding groups, and that CMR 1 and 2 are transmitted by TRP 1 and CMR 3 and 4 are transmitted by TRP 2. A UE can report group 1/2 as follows.

As an example, a UE may report CMR 1 and 2 through group 1. In other words, a UE can report the best combination among CMR 1, 2, 3, and 4 that can be simultaneously received without distinction of S-TRP/M-TRPs.

As an example, a UE may report CMR 2 and 3 through group 2. That is, a UE may search for a CMR combination that can simultaneously receive from TRP 1 and TRP 2, and may determine one CMR (one of CMRs 1 and 2) for TRP 1 and one CMR (one of CMRs 3 and 4) for TRP 2.

The CMR combinations reported through group 1 and group 2 may be the same or different. As an example, group 1 may be determined to be the same as the CMR combination reported through group 2 because there is no restriction (S-TRP or M-TRP) related to a TRP. For example, there may be both a CMR combination (combination 1) that can be simultaneously received from an S-TRP and a CMR combination (combination 2) that can be simultaneously received from M-TRPs. Combination 1 with better quality can be reported through group 1. In this case, the CMR combination reported through group 1 is different from the CMR combination reported through group 2.

If the CMR combinations reported through group 1 and group 2 are different, the CMR combination of group 1 may be a combination from an S-TRP. After receiving the report, a base station can schedule by selecting whether to perform S-TRP transmission (with beam of CMR 1 and/or 2) corresponding to group 1 or M-TRP transmission (with beams of CMR 2 and 3) corresponding to group 2. In other words, through group 1 reporting, a base station can perform a TRP selection (S-TRP or M-TRP) during DL scheduling.

On the other hand, if the CMR combination reported through group 1 and group 2 is the same, a base station may determine that the M-TRP best beam combination is the best. A base station can perform DL scheduling based on M-TRPs.

Or/and group 3 (or 4) may be added in the above-described example. Group 3 can be defined to report beams that can be simultaneously received on the same Rx panel (or another Rx panel). That is, a group quantity of group 3 can be configured to CMRs (or beams) received simultaneously on the same Rx panel or CMRs (or beams) received simultaneously on different Rx panels.

The group quantity may have a fixed definition for each group (index) or may be configured (through RRC/MAC CE)/indicated (through DCI) by the base station. Or/and, a UE may determine a quantity of each group during group-based reporting and report it additionally along with beam reporting.

As another example, in a beam reporting operation (based on Option 2) of a UE according to a configuration/indication of a base station, when a UE reports two groups, but two beams per group are reported, the following groups can be assumed.

Group 1 may be a CMR combination configuration in which a group quantity can be simultaneously received without distinction between S-TRP/M-TRP, and group 2 may be a CMR combination configuration in which a group quantity cannot be simultaneously received without distinction between the S-TRP/M-TRP (or without restrictions on simultaneous reception). A UE can report group 1/2 as follows.

In group 1, a UE may have to report only CMR combinations that can be simultaneously received, and in group 2, the UE may have to report preferred CMRs without restrictions on simultaneous reception. That is, a UE can perform group-based beam reporting for group 1 and non-group-based beam reporting for group 2. Through the above configuration, a UE can perform group-based beam reporting and non-group-based beam reporting together.

As another example of the second embodiment, a UE may report three CMRs in a specific beam report (or/and a specific reporting group) and operate as follows.

A UE may select the best CMR (CMR0) and the second best CMR (CMR1) regardless of whether they are simultaneously received, and select additionally one CMR (CMR2) that can be simultaneously received with the best CMR and report it.

The CMR1 and CMR2 may be the same CSI-RS/SSB. If a CMR (e.g., CMR2) that can be received simultaneously with the best CMR is the second best CMR (e.g., CMR1), a UE may operate based on at least one of the following a) to c) when configuring a payload of report contents.

a) Repeatedly transmit the same RS ID (e.g., CRI/SSB-RI)

b) Omit CMR2 and CMR 2 related L1-RSRP/SINR c) Construct UCI by filling in the CMR2 and CMR2-related L1-RSRP/SINR positions with specified values (e.g., all zero)

The following effects are derived through defining/configuring or/and reporting a group quantity in Proposal 1 above.

Group-based beam reporting of a UE may support M-TRP specific beam reporting.

In addition, in existing group-based beam reporting (Rel-15 group-based reporting), the problem that a base station could not confirm the properties of CMRs (e.g., CMRs from an S-TRP/CMRs from M-TRPs) within the reporting group can be solved.

The above proposal 1 may also be applied to other Options (e.g., Option 1) among the beam reporting enhancement candidate options.

For example, in the case of Option 1, each group is composed of CMRs from each TRP. Therefore, a similar concept/definition can be used instead of the concept of group quantity described above. Specifically, CMRs based on the n-th CMR within each group may be CMRs determined based on a concept similar to the group quantity. A base station can define/configure for a UE to perform the above operation.

A concept similar to the group quantity may be configured to include/represent at least one of the following 1) to 6).

1) Configuration of CMR combination from an S-TRP that cannot be simultaneously received 2) Configuration of CMR combination from an S-TRP that can be simultaneously received 3) Configuration of CMR combination from M-TRPs that cannot be simultaneously received 4) Configuration of CMR combination from M-TRPs capable of simultaneous reception 5) Configuration of CMR combination received through the same Rx panel 6) Configuration of CMR combination received through different Rx panels Or/and, a UE may additionally report information on the n-th CMRs within each group along with beam reporting when group-based reporting. In other words, a concept of a CMR/beam quantity for the n-th CMRs within each group can be introduced.

Additionally, when considering multi-TRP transmission introduced in Rel-16/17, RX timing (RXT) may have different values for each TRP-UE. For example, RXT1 may be required for TRP1-UE and RXT2 may be required for TRP2-UE. RXT1 and RXT2 may have different values. For example, when a difference in a distance between TRP-UEs is large (i.e., when a difference between a distance between TRP1-UE and TRP2-UE is large), a difference in the RXT value may occur. If a difference between RXT1 and RXT2 increases as described above, multi-TRP transmission performance may deteriorate.

For example, if a difference between RXT1 and RXT2 increases beyond a cyclic prefix (CP) length, significant performance degradation can be expected to occur due to Inter Symbol Interference (ISI) between two signals.

Methods for solving the above-mentioned problems will be discussed below.

According to one embodiment, the group quantity may include information on whether a UE reports a CMR combination with the same/similar RXT (e.g., synchronous Rx) or a CMR combination with a large difference of RXT. (e.g., asynchronous Rx)

In other words, the group quantity can be configured to include/indicate a CMR combination (e.g., CMRs received based on synchronous RX) capable of synchronous reception or a CMR combination in which synchronous reception is not possible (e.g., CMRs received based on asynchronous reception (asynchronous RX)).

In the above proposal, 'RXT difference' may mean a difference in reception timing between two CMRs expressed in msec units (from the UE's perspective) or a symbol/slot level offset.

In the above example, each CMR combination can be defined as follows.

A CMR combination with the same/similar RXT may mean a CMR combination with an RXT offset value within a certain threshold. As an example, a CMR combination having the same/similar RXT may mean a CMR combination in which the largest difference value between RXTs according to CMRs included in the CMR combination is less than or equal to the certain threshold.

A CMR combination with a large difference in RXT may mean a CMR combination with an RXT offset value that exceeds a certain threshold. As an example, a CMR combination with a large difference in RXT may mean a CMR combination in which the smallest difference value between RXTs according to CMRs included in the CMR combination is greater than the certain threshold.

A base station can perform the subsequent DL scheduling for a UE by considering the synchronous/asynchronous transmission environment between TRPs through the additional reporting standard (group quantity) configured in a UE (reported by a UE). As an example, M-TRP-based DL scheduling may be performed to exclude a TRP with a large difference in RXT compared to other TRPs among a plurality of TRPs. As another example, M-TRP-based DL scheduling may be performed based on TRPs associated with the CMR combination with the same/similar RXT.

[Proposal 2]

In the above-described Option 3 (improvement method based on non-group-based beam reporting), operations based on at least one of the following 1), 2), or 3) may be considered.

1) It can be promised/defined/assumed between a base station and a UE that simultaneous reception is possible for up to the first m beams (or/and last m) among the M beams reported in each CSI-ReportConfig (connected/related to each other) of the UE. The remaining M-m beams may be promised/defined/assumed between a base station and a UE as simultaneous reception is not guaranteed.

2) It may be promised/defined/assumed between a base station and a UE that simultaneous reception of up to the first m beams is not guaranteed. The remaining M-m beams can be promised/defined/assumed between a base station and a UE as being capable of simultaneous reception.

3) The m value and whether simultaneous reception of the m value is possible/impossible may be configured/indicated by a base station or reported by a UE.

For example, CSI-ReportConfig 1={CMR 1, 2, 3, 4} and CSI-ReportConfig 2={CMR 5, 6, 7, 8} may be connected/related for M-TRP beam reporting purposes. When two beams are reported for each CSI-ReportConfig (M=2), a UE may report CMR 1 and 2 based on CSI-ReportConfig 1 and CMR 5 and 6 based on CSI-ReportConfig 2. The first (i.e., m=1) beam reported (i.e., CMR 1 and 5 in each report) may be specified/defined/configured as capable of simultaneous reception, and the second beam (i.e., CMR 2 and 6 in each report) may be specified/defined/configured as not guaranteeing simultaneous reception.

Here, if m>1, the following operation/configuration may be considered in relation to whether simultaneous reception is guaranteed.

A base station may define/configure the following i) or ii) to a UE, or indicate a UE to switch the configured i) (or ii)) to ii) (or i)).

i) It is promised/defined that simultaneous reception is possible by 1:1 mapping 1st, 2nd . . . m-th CMR in order in each report ii) It is promised that a combination of any one of {1st, 2nd . . . m-th CMR} in report 1 and any one of {1st, 2nd . . . m-th CMR} in report 2 can be received simultaneously.

Alternatively, a UE may report information indicating i) or ii) to a base station.

Additionally, in addition to the m value and whether simultaneous reception of the m value is possible/impossible, whether a combination of m CMRs from each CSI-ReportConfig is received by a UE through the same Rx panel or different Rx panels can be defined/configured between a UE/base station. The combination of the m CMRs may include i) a 1:1 mapping combination of the 1st, 2nd, and m-th CMRs in each report or ii) a combination of any one of {1st, 2nd, m-th CMR} in report 1 and {1st, 2nd, m-th CMR} in report 2.

A UE may report information indicating whether the combination of the m CMRs is received through the same Rx panel or different Rx panels to a base station.

[Proposal 3]

In the following, a differential L1-RSRP/L1-SINR based beam reporting method is described in the beam reporting operation based on the above-described Options (Option 1 to Option 3).

According to Rel-15/16 legacy operation, in L1-RSRP/L1-SINR based beam reporting, if the number of CMR/beams reported in CSI-ReportConfig by a configuration of a base station is more than 1, a UE may report an L1-RSRP/L1-SINR value quantized as a 7-bit value for the best beam (or/and largest measured value) and may report, for the remaining beam(s), differential L1-RSRP/L1-SINR value(s), which is differential value(s) from the best beam, as 4-bit value(s) quantized with a larger step size.

In Option 1 to Option 3, a UE operation is proposed when differential L1-RSRP/L1-SINR based beam reporting is performed by ae UE.

i) When differential L1-RSRP/L1-SINR based beam reporting is performed in Option 1

In Option 1, each report group may correspond to each TRP, so CMRs reported within a specific group may be CMRs from a specific TRP. In this case, when the number of CMRs reported in each group exceeds 1, a UE may report L1-RSRP/L1-SINR values quantized as 7-bit values when reporting the L1-RSRP/L1-SINR of the 1st CMR, which is the best CMR within each group, and may report, for the remaining CMR(s) reported within the group, differential L1-RSRP/L1-SINR value(s), which is difference value(s) from the best CMR, as a 4-bit value(s) quantized with a larger step size.

ii) When differential L1-RSRP/L1-SINR based beam reporting is performed in Option 2

In Option 2, each report group may be composed of a specific CMR combination (e.g., CMR combination from a S-TRP, CMR combination from M-TRPs). In this case, the first group among the reported group(s) may be the best group including the best CMR combination. When the number of reported groups exceeds 1, a UE may operate as follows. A UE may report a L1-RSRP/L1-SINR value quantized as a 7-bit value when reporting the L1-RSRP/L1-SINR of the CMR combination in the best group (first group), and may report, for CMR combination(s) in the remaining group(s), differential L1-RSRP/L1-SINR value(s) as 4-bit value(s) quantized with a larger step size.

More specifically, in Option 2, if a UE reports the 1st best beam pair in group 1 and the n-th best beam pair in group n, the UE may report a L1-RSRP/L1-SINR value of group 1 as a 7-bit value so that it can report the best CMR combination for each TRP, and may report a L1-RSRP/L1-SINR value of the 1st CMR of each remaining group is reported as a relative value (difference value) based on the L1-RSRP/L1-SINR value of the 1st CMR in group 1, and may report a L1-RSRP/L1-SINR value of the m-th CMR of each remaining group as a relative value (difference value) based on the L1-RSRP/L1-SINR value of the m-th CMR within group 1.

Or/and, a UE may report a 7-bit value for the first CMR of each group and report a differential L1-RSRP/L1-SINR value as a 4-bit value quantized with a larger step size for the second CMR. Or/and, a UE may report a 7-bit value for only the first CMR of the first group and may report the differential L1-RSRP/L1-SINR values as a 4-bit values quantized with a larger step size for all remaining CMRs. Through the above operation, reporting payload can be saved even if the number of beams reported through M-TRP specific beam reporting increases.

iii) When differential L1-RSRP/L1-SINR based beam reporting is performed in Option 3

In Option 3, each CSI-ReportConfig (connected/related to each other) may correspond to each TRP. CMRs reported within a specific CSI-ReportConfig may be CMRs from a specific TRP. In this case, when the number of CMRs reported in each CSI-ReportConfig exceeds 1, a UE may report a L1-RSRP/L1-SINR value quantized as a 7-bit value when reporting the L1-RSRP/L1-SINR of the 1st CMR, which is the best CMR in each CSI-ReportConfig, and may report, for the remaining CMR(s) reported in CSI-ReportConfig, differential L1-RSRP/L1-SINR value(s), which is the difference value(s) from the best CMR, as 4-bit value(s) quantized with a larger step size.

Specifically, when the number of CMRs reported in each CSI-ReportConfig (connected/related to each other) exceeds 1, a method for reporting differential L1-RSRP/L1-SINR without UE ambiguity is proposed.

When reporting L1-RSRP/L1-SINR for CMR(s) in each CSI-ReportConfig (connected/associated with each other), a UE may operate based on the following a) or b).

a) A UE reports a L1-RSRP/L1-SINR value for the best beam (or/and largest measured value) among CMR(s) corresponding to the m CMRs that can be simultaneously received in Proposal 2 as a 7 bit value, and report L1-RSRP/L1-SINR value(s) of the remaining CMR(s) are reported as 4 bit value(s).

b) A UE reports a L1-RSRP/L1-SINR value for the best beam (or/and largest measured value) among CMR(s) corresponding to the remaining M-m CMRs without simultaneous reception restrictions in Proposal 2 as a 7 bit value, and report L1-RSRP/L1-SINR value(s) of the remaining CMR(s) are reported as 4 bit value(s).

That is, in case a), m CMR(s) are located in the first m (or/and best/largest value m) in the above report, and in case b), m CMR(s) are located in the last m (or/and best/smallest value m) in the above report.

Depending on the channel environment of a UE, the m beams that can be simultaneously received may not correspond to the best beam, rather than a), b) can be considered a less risky operation in UE operation.

In case b), the best CMR among M-m CMRs with no restrictions on simultaneous reception is reported, and for the (last) m CMRs, L1-RSRP/L1-SINR reporting can be performed through the differential value with the corresponding best CMR. Depending on the UE channel environment, since the best CMR among M-m CMRs and the best CMR among m CMRs may be the same CMR, the two best CMRs may be reported with the same index, and in the case of the best CMR among m CMRs, the differential L1-RSRP/L1-SINR reporting value may be reported as 0 dB (i.e., no difference from the best beam).

The operations for a) and b) may be configured/defined by a base station or may be additionally performed in a UE's report.

With the operations of a) and b) above, a UE may recognize which of the reported CMRs (m+(M−m)) a 7 bit L1-RSRP/L1-SINR value should be reported for and perform differential L1-RSRP/L1-SINR reporting.

The operation i) for Option 1 of Proposal 3 is also applicable to Option 2. Or/and the operation ii) for Option 2 is also applicable to Option 1.

In the operations of i), ii), and iii) above, an index of the reported CMR (CSI-RS or/and SSB) may be expressed with a bit width corresponding to $\text{ceil}(\log_2(K_s^{CSI-RS}))$ $K_s^{CSI-RS}$ may correspond to the number of CSI-RS resource(s) (and/or SSB resource(s)) in a CSI resource set for channel measurement belonging to CSI-ResourceConfig connected to CSI-ReportConfig.

The lowest codepoint of the corresponding bit width is sequentially mapped from the lowest CSI-RS (and/or SSB) index in the corresponding CSI resource set.

Proposal 3 has the advantage that a UE can save a payload size transmitted (via PUSCH/PUCCH) when reporting an M-TRP related beam.

Prior to the beam reporting of Proposal 1 and Proposal 2 above, in configuring a CMR for beam measurement of a CSI resource setting connected to CSI-ReportConfig, a base station's configuration for distinguishing a source TRP transmitting the CMR may be explicitly/implicitly preceded. For example, a base station can configure/connect multiple CSI resource sets (or CMR sets) configured in a CSI resource setting per set. A UE can perform beam reporting of Proposal 1 and Proposal 2 based on the promise/assumption that CMRs configured in different CSI resource sets are CMRs from different TRPs.

Proposals 1 to 3 (i, ii, and iii of proposal 1, proposal 2, and proposal 3) can be independently applied to operations between a base station and a UE, and a combination of at least one of Proposals 1 to 3 may be applied to operations between a base station and a UE.

Hereinafter, a method that can be additionally applied to at least one of the above-mentioned proposals 1 to 3 is described. The method described below may be applied to base station-terminal operation independently of proposals 1 to 3.

As shown in Table 10 below, it was agreed at the standardization meeting to support option 2 for the M-TRP specific beam reporting method.

Table 10 below summarizes the agreements related to M-TRP beam measurement and reporting.

TABLE 10

Agreement
Down-select at least one of the following options for beam measurement/reporting e
nhancement to facilitate inter-TRP beam pairing in RAN1 #104-e
  1) Option 1: In a CSI-report, UE can report N>1 pair/groups and M>=1 beams
per pair/group
    a) Different beams in different pairs/groups can be received simultaneously
    b) FFS: whether M is equal or can be different across different pair/group
  2) Option 2: In a CSI-report, UE can report N(N>=1) pairs/groups and M (M>1) beams
per pair/group
    a) Different beams within a pair/group can be received simultaneously
  3) Option 3: UE report M(M>=1) beams in N (N>1) CSI-reports corresponding
to N report setting
    a) Different beams in different CSI-reports can be received simultaneously
    b) FFS: whether/how to introduce an association between different CSI-reports
    c) FFS: whether/how to differentiate reported measurements for beams that are received
simultaneously vs. beams that are not received simultaneously
      i) Whether/how to introduce an indication along with the CSI-reports to indicate
whether the beams in different CSI-reports can be received simultaneously
  4) FFS: value of N and M in each option
  5) FFS: Association between different beams in above options and different TRP/UE
panels
  6) FFS: Identify new use cases per option compared with R16 (including backhaul)
  7) FFS: whether different beams in different pairs/groups/reports can be received by same
spatial filter per option
Agreement
For beam measurement in support of M-TRP simultaneous transmission
  1) Support a single CSI-report consisting of N beams pairs/groups and M (M>1)
beams per pair/group, and different beams within a pair/group can be received simu
ltaneously
    a) Support M = 2
    b) Support extending the maximum value of N > 1, exact value FFS
    c) N=1 and N=2

TABLE 10-continued i) FFS: Other values larger than 2
ii) FFS: Whether the UE could report beams are received with different RX bea
ms
2) Further study the support of option 1 and option 3
3) The above applies at least for L1-RSRP
4) FFS: L1-SINR
Agreement
For beam reporting option 2
1) On the maximum number of beam pairs/groups (N) that can be reported in a single
CSI-report, discuss and down-select from the following two alternatives in RAN1#105-e:
a) Alt1: Support maximum value N = {1, 2}
b) Alt2: Support maximum value N = {1, 2, 3, 4}
2) FFS: Introduce a UE capability Ncap on the maximum value of N in Rel.17
3) On the number of beam pairs/groups (N) reported in a single CSI-report, discuss and
down select between the following two alternatives in RAN1#105-e
a) Alt1: The value of N is fixed by RRC configuration
b) Alt2: The value of N is upper bounded by a maximum value Nmax configured by
RRC, and dynamically selected/indicated by UE That is, referring to Table 10, a CSI report includes N pairs/groups of beams, and M (M>1) beams for each pair/group. Here, the maximum number (N) of pairs/groups of beams reported within a single CSI report may be {1, 2} or {1, 2, 3, 4}. Additionally, the number (N) of pairs/groups of beams reported within a single CSI report may be configured by RRC signaling or selected/indicated by a UE within a maximum value range configured by RRC.

Option 2 is a type of group-based beam reporting. A UE reports N beam groups including M beams, where M beams in each group must be configured with a combination of beams that a UE can receive simultaneously. That is, when option 2 is used for M-TRP specific beam reporting, M beams may be composed of beams (i.e., CMRs) from different TRPs. As shown in Table 10, it has currently been agreed to support M=2, and as in the last agreement in Table 10, discussions are underway on whether to support values exceeding 2 for the N. In addition, because M beam combinations that a UE can simultaneously receive (e.g., the number of groups) may not exist as much as the N value configured by a base station, there is also discussion on the operation of a UE itself selecting/reporting the N value for the number of groups that the UE reports to a base station.

Hereinafter, in this disclosure, when a UE reports a beam pair (or beam group) to a base station, it means that the UE reports an index for a CSI-related resource (e.g., CSI-RS resources, SSB resources, etc.) and beam measurement information (e.g., L1-RSRP, L1-SIMR, etc.) for the CSI-related resource to the base station.

In addition, as described above, an operation in which a UE reporting a beam pair (or beam group) to a base station may be activated by a configuration of group-based reporting (or group-based beam reporting) (e.g., RRC parameter groupBasedBeamReporting) by a base station.

In the present disclosure, apart from the N value configured by a base station to a UE in option 2-based beam reporting, as in the background above, a method for a UE to report N or less N' (N'≤N) beam pairs/beam groups to a base station.

Here, when a UE does not find the configured N beam pair/beam group combinations (or when there is no beam pair/group that satisfies such conditions), the UE may report N or less N' (N prime) beam pairs/groups to a base station.

The conditions that a UE cannot find the corresponding N beam pair/group combinations and/or the conditions for a UE to report N or less N' beam pairs/groups to a base station are may be satisfied by at least one of i) to iii) below.

i) When one or more RSRP/SINR values of CMR(s) within a specific beam pair/group is below a certain threshold (e.g., a fixed value or a value configured by a base station), or/and as a result, when the number of CMR pairs/groups to report is less than the N ii) When all CMR resource sets/subsets configured by CMR resource configurations for M-TRP beam measurement purposes can be received only by a single Rx panel of a UE, or/and as a result, when the number of CMR pairs/groups to report is less than the N iii) If a CMR resource set or CMR resource subset is defined to distinguish CMR resources from each TRP, when the best CMR pair/group from each TRP can be received only by a single Rx panel of a UE, or/and as a result, when the number of CMR pairs/groups to report is less than the N In the present disclosure, '/' can be interpreted as 'and', 'or', or 'and/or' depending on the context.

Proposal A: Depending on a size of the N value (N is a natural number) configured by a base station, it can be determined whether a UE reports the configured N beam pairs/groups or a UE reports N' beam pairs/groups (N' is 2 or more, $2 \le N' \le N$).

Specifically, when the N value (N is a natural number) configured by a base station does not exceed a specific value (e.g., 2) (e.g., N=1 or 2), a UE can report N beam pairs/groups configured by the base station. On the other hand, if the N value configured by a base station exceeds a certain value (e.g., 2) (e.g., N=3 or 4), a UE can report N' beam pairs/groups less than or equal to the N (N' is 2 or more, $2 \le N' \le N$) to the base station. That is, if the N value configured by a base station exceeds a certain value (for example, 2), a UE may interpret the N value as corresponding to the upper bound for the number of beam pairs/groups to be reported by the UE. Accordingly, a UE can report the number of beam pairs/groups above a certain value (e.g., 2) and below the upper bound.

For example, if the N value is greater than a certain value (e.g., 2), in beam reporting, a UE can report the N' value, which is the number of beam pairs/groups to be reported to a base station, expressed in n bits. That is, a UE may transmit to a base station a CSI report including i) the N' value, which is the number of beam pairs/groups to be reported, ii) indexes of CMRs belonging to N' beam pairs/groups, iii) RSRP/SINR values (or differential RSRP/SINR) for each CMR.

The N' value may be encoded with a fixed bit size (e.g., n bit+channel coded bit) separately from beam reporting contents within a payload size for beam reporting. In other words, the N' value may be reported during beam reporting of a UE so that a base station can recognize a variable size of beam reporting contents that can change depending on the N' value.

For example, if 2 bits (2 or 3 or 4) are needed to express the N' value, a fixed bit size including 2 bits and 2 coded bits may be included in the earlier part of a beam reporting payload. Since a base station can accurately know an encoded bit size of a subsequent payload with a variable size according to the N' value, it can perform decoding on beam reporting contents. For example, if the N' value is reported as 2, it means that 2 beam pairs/groups are reported, therefore if M=2, a bitwidth (+ coded bit) corresponding to 4 CMR indices and 4 RSRP/SINR values (including differential RSRP/SINR) corresponds to the subsequent encoded bit size.

As in proposal A, there is an advantage in that a fixed bit size for reporting the N' value can be saved by reporting the N' value only when the N value exceeds a certain value (e.g., 2). For example, when reporting the N' value regardless of the N value, there are 5 states for the N' value, such as [none], 1, 2, 3, and 4, therefore 3 bits may be needed. On the other hand, by reporting the N' value greater than 2 only when the N is greater than 2, when the N is 3, there can be two states for the N' value, such as 2 and 3 (i.e., 1 bit is required), and if the N is 4, states for the N' value can be 2, 3, 4 (i.e., 2 bits required) or 2, 3 (i.e., 1 bit required). In addition, if the N' is not reported, a base station interprets N'=4, thereby saving a fixed bit size.

If the N' value is not reported and a UE reports the number of beam pairs/groups less than the N, since a base station must decode the UE beam reporting by performing blind detection/decoding for each encoded bit size of the beam reporting contents for all values of N=1, 2, 3, and 4, the problem of increasing base station implementation complexity arises.

As another example, a UE may not report the N' value, and the UE may construct and report an encoded bit size by filling in a beam reporting payload of a bit width including the CMR index number and a RSRP value (including differential RSRP) corresponding to the number of beam pairs/groups equal to the N value configured by a base station. That is, a UE may transmit to a base station a CSI report including i) indexes of CMRs belonging to N beam pairs/groups, ii) an RSRP/SINR value (or differential RSRP/SINR) for each CMR.

For the remaining bit field that exceeds the number of beam pairs/groups of the N' or less found by a UE, the UE may construct with dummy bits (e.g., padding bits such as '0000 . . . 0') or/and a known sequence. Accordingly, a base station can accurately decode information on the N or less beam pairs/groups. In other words, it corresponds to an implicit reporting method of the N' value.

In this case, since a base station can always expect to receive a beam reporting payload size corresponding to the N value configured by the base station, there is an advantage that the base station does not need to perform blind detection/decoding on the reported number of beam pairs/groups. Or/and, a UE may include the CMR index corresponding to the number of N beam pairs/groups set by a base station in beam reporting contents, the RSRP/SINR value (or differential RSRP/SINR value) corresponding to the CMR index corresponding to the dummy may be composed of dummy bits (e.g., padding bits such as '0000 . . . 00') or/and known sequences. By constructing it in this way, a UE may indicate to a base station that the corresponding CMR index (i.e., CMR index corresponding to RSRP/SINR value composed of dummy bit and/or known sequence) does not correspond to the (best) beam pair/group reported by the UE. Through this operation, in group based beam reporting based on option 2, there are two CMR indices within a group, however a UE may construct the RSRP/SINR value corresponding to one (or all) CMR index with dummy bits (e.g., padding bits such as '0000 . . . 00') or/and a known sequence. Therefore, a UE may report to a base station that the CMR(s) of the group are CMR(s) suitable for S-TRP or/and single-panel reception purposes rather than M-TRP or/and multi-panel reception purposes.

The N' reporting method of the above proposal A can also be used when a UE independently selects N' beam pairs/groups and reports them to a base station, regardless of the N value (i.e., regardless of whether a UE has been configured with the N value).

The above proposal can be used not only in beam reporting based on option 2 but also in other options (option 1 and/or option 3) or other beam reporting methods. For example, even in non-group-based beam reporting, when a base station configures to report N best beams, it can be used to report a value lower than that.

Or/and, in group-based beam reporting corresponding to option 1, it can be used in a method for reporting a value lower than the M value configured by a base station for the M value, which is the number of beams in the group.

As shown in Table 11 below, according to 3GPP standardization, different (two) CMR resource sets have been enhanced so that they can be configured/associated with a single CMR resource setting (or/and reportConfig). A UE may perform M-TRP specific beam reporting based on the promise/assumption that CMRs from different CMR resource sets are CMRs from different TRPs.

Table 11 below provides additional agreements regarding TRP-specific beam measurement and reporting.

TABLE 10

Agreement

For beam measurement in support of M-TRP simultaneous transmission

1) Support a single CSI-report consisting of N beams pairs/groups and M (M>1) beams per pair/group, and different beams within a pair/group can be received simultaneously a) Support M = 2 b) Support extending the maximum value of N > 1, exact value FFS c) N=1 and N=2 i) FFS: Other values larger than 2 ii) FFS: Whether the UE could report beams are received with different RX beams

2) Further study the support of option 1 and option 3

3) The above applies at least for L1-RSRP

4) FFS: L1-SINR

TABLE 10-continued

Agreement
  1) For beam measurement/reporting option 2, the maximum number of beam groups in a
single CSI-report is a UE capability and may take value from $N_{max} = \{1,2,3,4\}$ in Rel.17.
    a) FFS: If UCI payload reduction for $N_{max}>=2$ is needed and if so, how
  2) The number of beam groups (N) reported in a single CSI-report
Alt1: The value of N is configured by RRC signaling
Agreement
On CMR resource configuration for beam reporting option 2, decide in RAN1#105-e
whether to adopt "set" or "subset":
  1) NOTE: the following has been agreed
    a) Two CMR resource sets or subsets, per periodic/semi-persistent CMR resource setting
      i) FFS : extension to aperiodic CMR resource setting if two CMR resource sets are
supported
    b) Each reported beam pair in a single CSI -report consists of M = 2 SSBRI/CRI values,
where each SSBRI /CRI points to a CMR resource in a different CMR resource set or
subset.
  2) FFS : bit width of each SSBRI/CRI determined based on the number of SSB/CSI-RS
resources from the associated set/subset, or across two sets/subsets
Agreement
For CMR configuration for option 2, adopt
  1) Alt-1: "set"
Agreement
The bit width of each SSBRI/CRI is determined based on the number of SSB/CSI-RS
resources in the associated CMR resource set
  1) FFS: specify the association between SSBRIs/CRIs in a reported group and CMR
resource sets Referring to Table 11, in addition to the agreement in Table 10, two CMR resource sets can be configured for each periodic/semi-persistent CMR resource setting. In addition, each beam pair reported in a single CSI report includes M (=2) SSBRI (SSB Resource Indicator)/CRI (CSI-RS Resource Indicator) values, here each SSBRI/CRI indicates one CMR resource in the other CMR resource set. A bit width of each SSBRI/CRI is determined based on the number of SSB/CSI-RS resources in a corresponding CMR resource set.

According to the Option 2-based beam reporting operation, a UE can report multiple (up to 4) pairs/groups, and each group may be composed of different CMRs from different TRPs (i.e., from different CMR resource sets per CMR resource setting). It was agreed that a local index or a bit width of each CMR in a group is determined from the number of CMRs in each CMR resource set. In this case, there is an ambiguous problem (Problem 1) about how to assume and report an index and an order of different CMR resources within each group.

Proposal B: As a solution to Problem 1 above, in reporting on a plurality (N) of groups when Option 2-based beam reporting is performed, methods for assuming/defining an order and bit width configuration of two CMRs in each group between a base station and a UE are described.

When a UE selects CMRs from two CMR (CSI) resource sets to report two CMRs in each group (in reporting payload), the UE can perform group-based beam reporting by assuming that a CMR resource selected from the first/lowest CMR (CSI) resource set of the two sets is located first.

In other words, it can be assumed that CMR resource set #1 and CMR resource set #2 exist in the CMR resource setting associated with reportConfig #1 for M-TRP specific beam reporting. In this case, an order of CMR resources within each group can be assumed/specified/defined as follows.

i) CMR index from CMR resource set #1, ii) CMR index from CMR resource set #2

In CSI configuration, the following will be described in detail assuming that there are 4 CMR resources in CMR resource set #1 and 8 CMR resources in CMR resource set #2.

A bit width of local indexes to represent CMRs in CMR resource set #1 is log 24, which is 2 bits, and a bit width of local indexes to represent CMRs in CMR resource set #2 is log 28, which is 3 bits. In this case, if the proposal for Problem 1 above is applied, each group is configured with a 5-bit payload containing information on two CMRs. In the payload, 2 bits representing the CMR index in CMR resource set #1 may be located first among the 5 bits, and 3 bits representing the CMR index in CMR resource set #2 may be located later among the 5 bits.

The proposed method for Problem 1 is applicable to Proposals 1, 2, and 3.

On the other hand, in the M-TRP specific beam reporting operation, a UE can report multiple (up to 4) pairs/groups. If 4 groups are reported, since i) indexes for 8 CMRs and ii) 8 RSRP/SINR values corresponding to 8 CMRs should be included in a reporting payload of a single CSI report, a discussion of differential RSRP/SINR reporting is underway in RAN1 standardization.

Hereinafter, in the description of the present disclosure, the best beam CMR refers to a CMR with the highest RSRP/SINR value among CMRs belonging to all beam pairs/groups to be reported by a UE. Additionally, the best beam pair/group refers to a beam pair/group to which the best beam CMR belongs.

FIG. 14 illustrates a differential RSRP/SINR reporting method for a plurality of beam groups in CSI reporting.

When a UE reports 4 beam groups as shown in FIG. 14, three differential RSRP/SINR reporting methods can be considered.

In the case of FIG. 14(a), a UE may report a 7 bit RSRP/SINR value for the best RSRP/SINR for the best CMR in the RSRP/SINR values for 8 CMRs. Additionally, the UE can report 4-bit differential RSRP/SINR values (calculating the difference from the best RSRP/SINR with a 2 dB step size) for the remaining 7 CMRs. In this case, a total of 35 bits (=7+7+6*4) are required as a minimum.

In the case of FIG. 14(b), a UE may report 7 bit RSRP/SINR values (i.e., for each of the two CMRs belonging to a first group) for a first group (e.g., best M-TRP beam pair).

In addition, for the remaining groups, the UE may report 4 bit differential RSRP/SINR values as RSRP/SINR values corresponding to CMRs from each TRP (i.e., CMR resource set) based on the best RSRP/SINR value of each TRP (i.e., CMR resource set) of a first group. That is, the differential RSRP/SINR value can be calculated based on the RSRP/SINR value of the best CMR belonging to the same CMR resource set.

Alternatively, a UE may report differential RSRP/SINR values for CMRs belonging to the remaining groups based on the best RSRP/SINR value of the best CMR in a first group (i.e., regardless of CMR resource set). This can be considered a similar operation to ii of Proposal 3 above.

In the case of FIG. 14(b), a total of 38 bits (=7+7+6*4) are required as a minimum.

In the case of FIG. 14(c), it corresponds to a method in which 4 bit differential RSRP/SINR values for other CMRs in a group is reported based on the RSRP/SINR value of the best CMR in each group. In this case, a total of 44 bits (=4*7+4*4) are required as a minimum.

In the case of FIG. 14(a), even if the solution to Problem 1 is applied, in the best group, which CMR of CMR pairs from two TRPs (i.e., CMR resource set) corresponds to the best value may vary depending on the situation. Therefore, a 1-bit field indicating which CMR (or which CMR resource set) among the CMR pairs for a first group includes the best value may need to be additionally considered.

However, the case of FIG. 14(b) has the advantage that such a problem does not occur. However, since FIG. 14(a) uses 7 bit values only for the best RSRP/SINR, 3 bits can be saved compared to using 7 bit values for 2 CMRs as shown in (b). In addition, even if the additional 1 bit field mentioned above is added, there is an advantage in saving 2 bits of reporting payload.

However, as a critical problem (problem 2) in (a), when the RSRP/SINR difference between M-TRP beam pairs is very large, a problem may occur in which the differential values for the remaining 7 CMRs cannot be expressed with 4 bits representing a difference value from the best CMR, that is, the differential value. For example, the RSRP/SINR difference value that can be expressed in 4 bit width based on 2 dB step size can express up to (16-1)*2=30 dB (when including 0 dB difference) difference. Here, for example, if a UE reports 4 groups/pair for M-TRP beam reporting, the difference between the RSRP value of the best CMR in the first best group and the worst RSRP value in the last group is likely to exceed 30 dB. This will be described with reference to the figures.

FIG. 15 illustrates a result of an experiment on differences in RSRP when different panels of a UE transmit and receive with different TRPs in an M-TRP environment.

FIG. 15(a) illustrates link gain difference [dB] in an indoor hotspot, and FIG. 15(b) illustrates link gain difference [dB] in an outdoor environment (urban macro).

Referring to the experimental results of an RSRP difference between TRPs in FIG. 15, it can be seen that an RSRP difference from a TRP connected to each panel of a UE is as large as 50 dB (indicated by a dotted circle in FIG. 15). This result is a result for the best beam pair, and in situations where more than 1 beam pair/group is reported, a difference between a RSRP value of the best beam of the best beam group and a RSRP value of beams from other TRPs belonging to the remaining beam group is expected to increase further.

Proposal C: As a solution to Problem 2 above, like the method of proposal A above, a method of reporting the number of reported beam pairs/groups through a fixed bit (e.g., predetermined or configured by a base station) in a reporting payload can be used (e.g., report one of values less than the N value configured by the base station). That is, using a fixed bit in a reporting payload, the number of reported beam pairs/groups through a reporting payload can be reported.

Here, a value of the number of beam pairs/groups reported may be determined depending on whether it is within or exceeds a range that a RSRP/SINR value difference between each CMR in a non-best beam pair/group and the best CMR of the best beam pair/group can be covered by 4 bits expressing a differential RSRP/SINR value. (e.g., 30 dB or 32 dB). In other words, the number of beam pairs/groups reported through the reporting payload may correspond to the number of beam pairs/groups within a range that can be covered by 4 bits representing a differential RSRP/SINR value (e.g., 30 dB or 32 dB).

In other words, for example, when a UE performs beam reporting based on FIG. 14(a), among beam pairs/groups, the number of beam pairs/groups to be reported can be informed to a base station in a fixed bit of a reporting payload, excluding beam pairs/groups that have a CMR whose difference value exceeds a certain value (e.g. 30 dB or 32 dB) from the best CMR. When receiving reporting, a base station can determine a size of the remaining payload excluding the fixed bit through the fixed bit and then decode the remaining payload without ambiguity. That is, a UE can transmit a CSI report including i) the number of beam pairs/groups to be reported, ii) indexes of CMRs belonging to the corresponding beam pair/group, iii) RSRP/SINR value (or differential RSRP/SINR) for each CMR to a base station.

Through this operation, a beam reporting payload can be reduced depending on the situation, and a base station can also perform decoding for beam reporting without ambiguity. In addition, an effect of solving the problem of not being able to express a RSRP/SINR differential value with 4 bit width can be achieved.

Proposal D: As an additional solution to Problem 2 above, a step size of a differential RSRP/SINR value reported by a UE during M-TRP beam reporting can be configured/defined to a value exceeding 2 dB (e.g., 3 dB or 4 dB).

Alternatively, as an additional solution to Problem 2 above, a UE maintains a 2 dB step size of a differential RSRP/SINR value reported during M-TRP beam reporting, and a bit width expressing the differential RSRP/SINR value may be configured/defined to a value exceeding 4 bits (for example, 5 bits or 6 bits).

Through this method, a UE can express through a differential value even when a difference in RSRP/SINR values in a beam pair/group between TRPs is large (e.g., a difference of 50 dB or more) during M-TRP beam reporting.

Proposal D-1: And/or, the method of Proposal D may be applied limited to a differential RSRP/SINR value for a specific TRP (i.e., CMR resource set). Specifically, in the beam reporting, a 4 bit differential value (with the same 2 dB step size as before) can be used in a differential RSRP/SINR value for a specific TRP (i.e., CMR resource set). However, for a differential RSRP/SINR value for the remaining TRP (i.e., CMR resource set), reporting can be performed by using a 4-bit differential value with an increased step size, as in proposal D above, or by increasing a bit width of a differential RSRP/SINR value. Here, for example, the specific TRP (i.e., CMR resource set) may correspond to the TRP (i.e., CMR resource set) to which the best CMR belongs, and the remaining TRPs may correspond to non-best TRPs (i.e., CMR resource set). Alternatively, for example, the specific TRP (i.e., CMR resource set) may be fixed in advance (e.g., CMR resource set of lowest/highest index) or may be configured by a base station.

Proposal D-2: And/or, the method of Proposal D may be applied limited to differential RSRP/SINR values for one or more specific beam pairs/groups. Specifically, when reporting N beam pairs/groups, the difference in RSRP/SINR values may become (relatively) larger starting from the specific nth pair/group, therefore starting from the nth group, reporting can be performed using the method of proposal D above.

Through the proposals D, D-1, and D-2, a differential value can be expressed over a wider range, and a base station can recognize a reporting payload and perform decoding for UE's M-TRP beam reporting.

Meanwhile, as an additional solution to Problem 2, a hybrid method of FIGS. 14(a) and 14(b) is proposed. In beam reporting, a UE can report the best CMR in the first best group with a 7 bit RSRP/SINR value. In addition, the UE can report the remaining CMRs of the first best group with (4 bit) differential RSRP/SINR values compared to the best CMR. In addition, for each remaining group, in the case of CMR for TRP #1 (i.e., CMR resource set #1), the UE can perform reporting by calculating (4 bit) differential RSRP/SINR values based on the best CMR of TRP #1 (i.e., TRP #1 CMR of the first group). Likewise, for CMR for TRP #2 (CMR resource set #2), the UE can perform reporting by calculating (4 bit) differential RSRP/SINR values based on the best CMR of TRP #2 (i.e., TRP #2 CMR of the first group).

Here, similar to the existing method in FIG. 14(a), a 1-bit indication may be required to indicate whether the CMR with the best RSRP/SINR of the first best group is a CMR from TRP #1 (i.e. CMR resource set #1) or a CMR from TRP #2 (i.e. CMR resource set #2).

The proposed methods C, D, D-1, and D-2 for problems 1 and 2 above may be turned on/off (i.e., set/not set, or enabled/disabled) or switched by a configuration of a base station (e.g., RRC/MAC CE, etc.).

Figure 16:
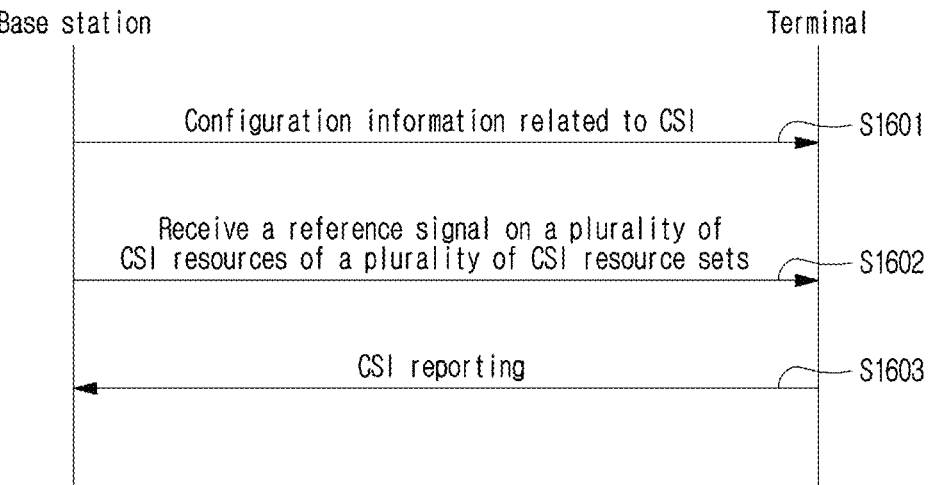
FIG. 16 is a diagram illustrating a signaling procedure between a base station and a UE for a method of transmitting and receiving control information according to an embodiment of the present disclosure.

FIG. 16 is a diagram illustrating a signaling procedure between a base station and a UE for a method of transmitting and receiving control information according to an embodiment of the present disclosure.

FIG. 16 illustrates a signaling procedure between a UE (user equipment) and a base station (BS) based on the previously proposed methods (e.g., any one of Proposal 1, Proposal 2, Proposal 3, Proposal A, Proposal B, Proposal C, Proposal D, and detailed embodiments thereof, or a combination of one or more (detailed) embodiments). The example in FIG. 16 is for convenience of explanation and does not limit the scope of the present disclosure. Some step(s) illustrated in FIG. 16 may be omitted depending on the situation and/or setting. Additionally, a base station and a UE in FIG. 16 are just one example and can be implemented with the device illustrated in FIG. 19 below. For example, the processor 102/202 of FIG. 19 can control to transmit and receive channels/signals/data/information, etc. using the transceiver 106/206, and can also control to store transmitted or received channels/signals/data/information, etc. in memory 104/204.

In addition, in the operation between a base station and a UE in FIG. 16, the above-described description can be referenced/used even if there is no separate mention.

A base station may refer to a general term for objects that transmit and receive data with a UE. For example, a base station may be a concept that includes one or more Transmission Points (TPs), one or more Transmission and Reception Points (TRPs), etc. Additionally, the TP and/or TRP may include a base station panel, a transmission and reception unit, etc. Additionally, "TRP" can be replaced with terms such as panel, antenna array, cell (e.g., macro cell/small cell/pico cell, etc.), TP (transmission point), base station, gNB, etc. As described above, TRPs may be classified according to information (e.g., index, ID) on a CORESET group (or CORESET pool). For example, if one UE is configured to transmit and receive with multiple TRPs (or cells), this may mean that multiple CORESET groups (or CORESET pools) are configured for one UE. Configuration of such a CORESET group (or CORESET pool) can be performed through higher layer signaling (e.g., RRC signaling, etc.).

Referring to FIG. 16, for convenience of explanation, signaling between one base station and a terminal is considered, but of course, the signaling method can be extended and applied to signaling between multiple TRPs and multiple UEs. In the following description, a base station can be interpreted as one TRP. Alternatively, a base station may include multiple TRPs, or may be one cell including multiple TRPs.

Referring to FIG. 16, a UE receives CSI-related configuration information from a base station (S1601).

The CSI-related configuration information may include information for configuring an operation based on the previously proposed method (e.g., any one of Proposal 1, Proposal 2, Proposal 3, Proposal A, Proposal B, Proposal C, Proposal D, and detailed embodiments thereof, or a combination of one or more (detailed) embodiments).

Here, the CSI-related configuration information may be transmitted separately into CSI reporting-related configuration information (i.e., CSI reporting settings) (e.g., RRC IE 'CSI-ReportConfig') (hereinafter, first configuration information) and CSI resource-related configuration information (i.e., CSI resource settings) (e.g., RRC IE 'CSI-ResourceConfig') (hereinafter, second configuration information).

In addition, as described above, a specific CSI-RS resource set(s) and/or CSI-SSB resource set(s) (i.e., a set of M (M is a natural number) CSI resources) are configured for CSI/L1-RSRP/L1-SINR measurement of DL RS (CSI-RS/SSB) according to the second configuration information. In particular, the second configuration information includes a plurality of CSI resource (e.g., CMR) configurations, and may additionally include information that a specific CSI resource is a CSI resource from a different TRP from other CSI resources.

Additionally, the second configuration information may be connected/related to specific first configuration information, and according to the reportQuantity in the first configuration information, a CSI-related report, L1-RSRP-related report, or L1-SINR-related report for the CSI resource set(s) configured by the connected/associated second configuration information may be reported by a UE. Here, the L1-RSRP-related report and the L1-SNIR-related reports can be collectively referred to as a beam report. In particular, the first configuration information may include configuration information for options 1, 2, and 3, and may include configuration information for a group quantity.

Additionally, the first configuration information may include a configuration for group-based (Beam) reporting (e.g., RRC parameter 'groupBasedBeamReporting'), and group-based (Beam) reporting may be configured/enabled by the configuration. Additionally, the number of N (N is a natural number) CSI resource groups subject to group-based (beam) reporting can be configured based on the first configuration information. Likewise, if group-based (Beam)

reporting is configured/enabled, a UE reports information on a plurality of CSI resource that can be received simultaneously in beam reporting (e.g., L1-RSRP, L1-SNIR, etc.) according to the first configuration information.

Additionally, in relation to group-based (beam) reporting, the second configuration information may include information on N (N is a natural number) CSI resource pairs/groups. Here, N CSI resource groups are each configured with M CSI resources, and M CSI resources can be selected one by one from each of the M CSI resource sets. Here, the M CSI resources for each of the N resource pairs/groups can be simultaneously received by the UE (i.e., the reference signal can be received simultaneously on the corresponding CSI resources). That is, M CSI resources belonging to the same resource pair/group (i.e., one selected from each of the M CSI resource sets) can be received simultaneously.

That is, when group-based (beam) reporting is configured, a UE performs beam reporting on the N CSI resource pairs/groups grouped/paired by selecting one from each of the M CSI resource sets (i.e., indexes of CSI resources belonging to the corresponding CSI resource pair/group and beam measurement (e.g., L1-RSRP, L1-SINR, etc.) information of the corresponding CSI resources).

A UE receives a reference signal (e.g., CSI-RS, SSB, etc.) on a plurality of CSI resources of a plurality (i.e., M) CSI resource set based on configuration information from a base station (S1602).

That is, a UE may receive a reference signal (e.g., CSI-RS, SSB, etc.) on a plurality of CSI resources in the M CSI resource set configured by the second configuration information. Here, as described above, a UE can simultaneously receive a reference signal on M CSI resources belonging to the same resource pair/group (i.e., one selected from each of the M CSI resource sets).

A UE transmits CSI to abase station based on the configuration information (S1603).

Here, when the number (i.e., N) of CSI pairs/groups subject to group-based (beam) reporting and group-based (beam) reporting is configured by the first configuration information, a UE performs beam reporting (e.g., L1-RSRP, L1-SNIR) on N CSI resource pairs/groups grouped/paired from the M CSI resource sets associated with the first configuration information. In other words, a UE may perform beam reporting (e.g., L1-RSRP, L1-SNIR) for pairs/groups of CSI resources generated by selecting CSI resources simultaneously received from each of the M CSI resource sets.

Here, as in the previously proposed method, even if N CSI resource pairs/groups are configured by a UE according to the first configuration information, the UE can perform beam reporting (e.g., L1-RSRP, L1-SNIR) for N' (N' is a natural number, $2 \leq N' \leq N$) CSI resource pairs/groups (i.e., CSI includes only beam reports for N' CSI resource pairs/groups). Here, beam reporting for a specific CSI resource among CSI resources belonging to N' CSI resource pairs/groups is performed using beam measurement values (e.g., L1-RSRP value, L1-SNIR value), and beam reporting for other CSI resources can be performed with differential beam measurement values (e.g. differential L1-RSRP value, differential L1-SNIR value) calculated with reference to the beam measurement value (e.g., L1-RSRP value, L1-SNIR value) for the specific CSI resource. Additionally, a UE may include information indicating a CSI resource set associated with the specific CSI resource in the CSI and report it to a base station.

Here, whether the CSI includes only reports on the N' CSI resource pairs/groups may be determined based on the size of the N value. For example, when N is 2 or less, a UE can always report on N CSI resource pairs/groups configured by the base station. On the other hand, if N exceeds 2, a UE can report on N' CSI resource pairs/groups.

In addition, when only reports on N' CSI resource pairs/groups are included in the CSI, the CSI may include the N' value, which is information on the number of CSI resource pairs/groups being reported. In this case, since the CSI only includes reports on N' CSI resource pairs/groups, a payload size of the CSI can be determined/changed based on the N' value.

Alternatively, even if only reports on N' CSI resource pairs/groups are included in the CSI, a payload size of the CSI may be fixed to a size when it includes reports on the N CSI resource groups. In this case, dummy bits or a known sequence may be added to a payload of the CSI other than reporting on the N' CSI resource groups.

In addition, when a UE only reports on N' CSI resource pairs/groups through the CSI, the UE may determine CSI resource group(s) in which differential beam measurement values (e.g., differential L1-RSRP values or L1-SINR values) can be quantized into 4 bits as the N' CSI resource groups.

Alternatively, without the above limitations, if more than 4 bits are required when quantizing the differential beam measurement values (e.g., differential L1-RSRP values or L1-SINR values) to a 2 decibel (dB) step size, for calculation of the differential beam measurement values (e.g., differential L1-RSRP values or L1-SINR values), the step size may be configured to a value exceeding 2 dB, or a bit width for reporting the differential beam measurement values (e.g., differential L1-RSRP values or L1-SINR values) may be configured to a value exceeding 4 bits. Here, the configuration for the step size or the bit width may be limited to apply only to one or more specific CSI resource sets that are part of M CSI resource sets configured in a UE. Alternatively, the configuration for the step size or the bit width may be limited to apply only to one or more CSI resource pairs/groups that are part of N (or N') CSI resource pairs/groups.

Figure 17:
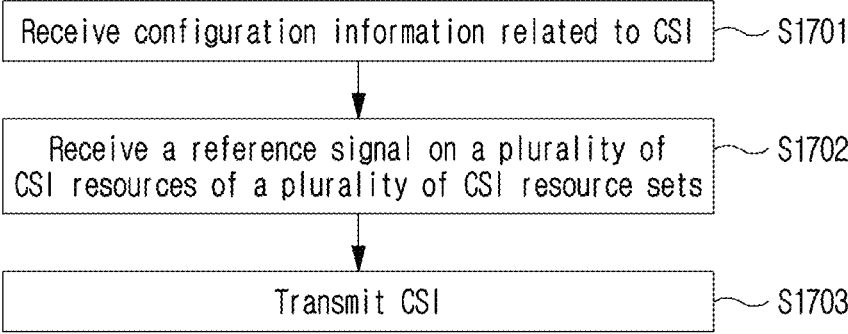
FIG. 17 is a diagram illustrating an operation of a UE for a method for transmitting and receiving channel state information according to an embodiment of the present disclosure.

FIG. 17 is a diagram illustrating an operation of a UE for a method for transmitting and receiving channel state information according to an embodiment of the present disclosure.

FIG. 17 illustrates an operation of a UE based on the previously proposed method (e.g., any one of Proposal 1, Proposal 2, Proposal 3, Proposal A, Proposal B, Proposal C, Proposal D, and detailed embodiments thereof, or a combination of one or more (detailed) embodiments). The example in FIG. 17 is for convenience of explanation and does not limit the scope of the present disclosure. Some step(s) illustrated in FIG. 17 may be omitted depending on the situation and/or setting. Additionally, the UE in FIG. 17 is only an example and may be implemented as a device illustrated in FIG. 19 below. For example, the processors 102/202 of FIG. 19 can control transmission and reception of channels/signals/data/information, etc. (e.g. RRC signaling, MAC CE, DCI for UL/DL scheduling, SRS, PDCCH, PDSCH, PUSCH, PUCCH, PHICH, etc.) using the transceivers 106/206. and also control to store transmitted or received channels/signals/data/information, etc. in the memory 104/204.

A UE receives CSI-related configuration information from a base station (S1701).

The CSI-related configuration information may include information for configuring an operation based on the previously proposed method (e.g., any one of Proposal 1, Proposal 2, Proposal 3, Proposal A, Proposal B, Proposal C, Proposal D, and detailed embodiments thereof, or a combination of one or more (detailed) embodiments).

Here, the CSI-related configuration information may be transmitted separately into CSI reporting-related configuration information (i.e., CSI reporting settings) (e.g., RRC IE 'CSI-ReportConfig') (hereinafter, first configuration information) and CSI resource-related configuration information (i.e., CSI resource settings) (e.g., RRC IE 'CSI-ResourceConfig') (hereinafter, second configuration information).

In addition, as described above, a specific CSI-RS resource set(s) and/or CSI-SSB resource set(s) (i.e., a set of M (M is a natural number) CSI resources) are configured for CSI/L1-RSRP/L1-SINR measurement of DL RS (CSI-RS/SSB) according to the second configuration information. In particular, the second configuration information includes a plurality of CSI resource (e.g., CMR) configurations, and may additionally include information that a specific CSI resource is a CSI resource from a different TRP from other CSI resources.

Additionally, the second configuration information may be connected/related to specific first configuration information, and according to the reportQuantity in the first configuration information, a CSI-related report, L1-RSRP-related report, or L1-SINR-related report for the CSI resource set(s) configured by the connected/associated second configuration information may be reported by a UE. Here, the L1-RSRP-related report and the L1-SINR-related reports can be collectively referred to as a beam report. In particular, the first configuration information may include configuration information for options 1, 2, and 3, and may include configuration information for a group quantity.

Additionally, the first configuration information may include a configuration for group-based (Beam) reporting (e.g., RRC parameter 'groupBasedBeamReporting'), and group-based (Beam) reporting may be configured/enabled by the configuration. Additionally, the number of N (N is a natural number) CSI resource groups subject to group-based (beam) reporting can be configured based on the first configuration information. Likewise, if group-based (Beam) reporting is configured/enabled, a UE reports information on a plurality of CSI resource that can be received simultaneously in beam reporting (e.g., L1-RSRP, L1-SINR, etc.) according to the first configuration information.

Additionally, in relation to group-based (beam) reporting, the second configuration information may include information on N (N is a natural number) CSI resource pairs/groups. Here, N CSI resource groups are each configured with M CSI resources, and M CSI resources can be selected one by one from each of the M CSI resource sets. Here, the M CSI resources for each of the N resource pairs/groups can be simultaneously received by the UE (i.e., the reference signal can be received simultaneously on the corresponding CSI resources). That is, M CSI resources belonging to the same resource pair/group (i.e., one selected from each of the M CSI resource sets) can be received simultaneously.

That is, when group-based (beam) reporting is configured, a UE performs beam reporting on the N CSI resource pairs/groups grouped/paired by selecting one from each of the M CSI resource sets (i.e., indexes of CSI resources belonging to the corresponding CSI resource pair/group and beam measurement (e.g., L1-RSRP, L1-SINR, etc.) information of the corresponding CSI resources).

A UE receives a reference signal (e.g., CSI-RS, SSB, etc.) on a plurality of CSI resources of a plurality (i.e., M) CSI resource set based on configuration information from a base station (S1702).

That is, a UE may receive a reference signal (e.g., CSI-RS, SSB, etc.) on a plurality of CSI resources in the M CSI resource set configured by the second configuration information. Here, as described above, a UE can simultaneously receive a reference signal on M CSI resources belonging to the same resource pair/group (i.e., one selected from each of the M CSI resource sets).

A UE transmits CSI to a base station based on the configuration information (S1703).

Here, when the number (i.e., N) of CSI pairs/groups subject to group-based (beam) reporting and group-based (beam) reporting is configured by the first configuration information, a UE performs beam reporting (e.g., L1-RSRP, L1-SNIR) on N CSI resource pairs/groups grouped/paired from the M CSI resource sets associated with the first configuration information. In other words, a UE may perform beam reporting (e.g., L1-RSRP, L1-SNIR) for pairs/groups of CSI resources generated by selecting CSI resources simultaneously received from each of the M CSI resource sets.

Here, as in the previously proposed method, even if a UE is configured with N CSI resource pairs/groups according to the first configuration information, the UE can perform beam reporting (e.g., L1-RSRP, L1-SNIR) for N' (N' is a natural number, $2 \leq N' \leq N$) CSI resource pairs/groups (i.e., CSI includes only beam reports for N' CSI resource pairs/groups). Here, beam reporting for a specific CSI resource among CSI resources belonging to N' CSI resource pairs/groups is performed using beam measurement values (e.g., L1-RSRP value, L1-SNIR value), and beam reporting for other CSI resources can be performed with differential beam measurement values (e.g. differential L1-RSRP value, differential L1-SNIR value) calculated with reference to the beam measurement value (e.g., L1-RSRP value, L1-SNIR value) for the specific CSI resource. Additionally, a UE may include information indicating a CSI resource set associated with the specific CSI resource in the CSI and report it to a base station.

Here, whether the CSI includes only reports on the N' CSI resource pairs/groups may be determined based on the size of the N value. For example, when N is 2 or less, a UE can always perform reporting on N CSI resource pairs/groups configured by the base station. On the other hand, if N exceeds 2, a UE can perform reporting on N' CSI resource pairs/groups.

In addition, when only reports on N' CSI resource pairs/groups are included in the CSI, the CSI may include the N' value, which is information on the number of CSI resource pairs/groups being reported. In this case, since the CSI only includes reports on N' CSI resource pairs/groups, a payload size of the CSI can be determined/changed based on the N' value.

Alternatively, even if only reports on N' CSI resource pairs/groups are included in the CSI, a payload size of the CSI may be fixed to a size when it includes reports on the N CSI resource groups. In this case, dummy bits or a known sequence may be added to a payload of the CSI other than reporting on the N' CSI resource groups.

In addition, when a UE performs only reporting on N' CSI resource pairs/groups through the CSI, the UE may determine CSI resource group(s) in which differential beam measurement values (e.g., differential L1-RSRP values or L1-SINR values) can be quantized into 4 bits as the N' CSI resource groups.

Alternatively, without the above limitations, if more than 4 bits are required when quantizing the differential beam measurement values (e.g., differential L1-RSRP values or L1-SINR values) to a 2 decibel (dB) step size, for calculation of the differential beam measurement values (e.g., differential L1-RSRP values or L1-SINR values), the step size may be configured to a value exceeding 2 dB, or a bit width for reporting the differential beam measurement values (e.g., differential L1-RSRP values or L1-SINR values) may be configured to a value exceeding 4 bits. Here, the configuration for the step size or the bit width may be limited to apply only to one or more specific CSI resource sets that are part of M CSI resource sets configured in a UE. Alternatively, the configuration for the step size or the bit width may be limited to apply only to one or more CSI resource pairs/groups that are part of N (or N') CSI resource pairs/groups.

Figure 18:
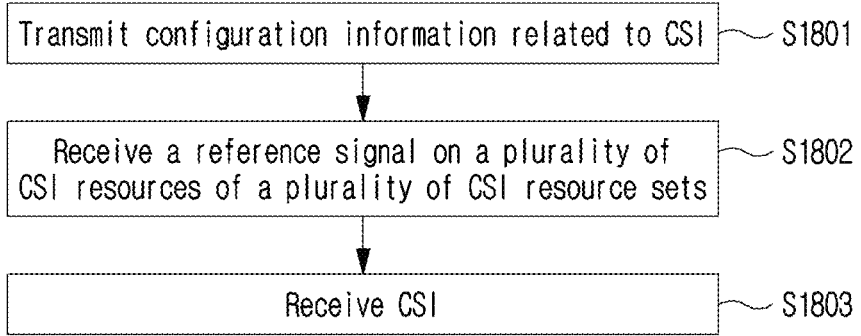
FIG. 18 is a diagram illustrating an operation of a base station for a method for transmitting and receiving channel state information according to an embodiment of the present disclosure.

FIG. 18 is a diagram illustrating an operation of a base station for a method for transmitting and receiving channel state information according to an embodiment of the present disclosure.

FIG. 18 illustrates an operation of a base station based on the previously proposed method (e.g., any one of Proposal 1, Proposal 2, Proposal 3, Proposal A, Proposal B, Proposal C, Proposal D, and detailed embodiments thereof, or a combination of one or more (detailed) embodiments). The example in FIG. 18 is for convenience of explanation and does not limit the scope of the present disclosure. Some step(s) illustrated in FIG. 18 may be omitted depending on the situation and/or setting. Additionally, the base station in FIG. 18 is only an example and may be implemented as a device illustrated in FIG. 19 below. For example, the processors 102/202 of FIG. 19 can control transmission and reception of channels/signals/data/information, etc. (e.g. RRC signaling, MAC CE, DCI for UL/DL scheduling, SRS, PDCCH, PDSCH, PUSCH, PUCCH, PHICH, etc.) using the transceivers 106/206. and also control to store transmitted or received channels/signals/data/information, etc. in the memory 104/204.

A base station transmits CSI-related configuration information to a UE (S1801).

The CSI-related configuration information may include information for configuring an operation based on the previously proposed method (e.g., any one of Proposal 1, Proposal 2, Proposal 3, Proposal A, Proposal B, Proposal C, Proposal D, and detailed embodiments thereof, or a combination of one or more (detailed) embodiments).

Here, the CSI-related configuration information may be transmitted separately into CSI reporting-related configuration information (i.e., CSI reporting settings) (e.g., RRC IE 'CSI-ReportConfig') (hereinafter, first configuration information) and CSI resource-related configuration information (i.e., CSI resource settings) (e.g., RRC IE 'CSI-ResourceConfig') (hereinafter, second configuration information).

In addition, as described above, a specific CSI-RS resource set(s) and/or CSI-SSB resource set(s) (i.e., a set of M (M is a natural number) CSI resources) are configured for CSI/L1-RSRP/L1-SINR measurement of DL RS (CSI-RS/SSB) according to the second configuration information. In particular, the second configuration information includes a plurality of CSI resource (e.g., CMR) configurations, and may additionally include information that a specific CSI resource is a CSI resource from a different TRP from other CSI resources.

Additionally, the second configuration information may be connected/related to specific first configuration information, and according to the reportQuantity in the first configuration information, a CSI-related report, L1-RSRP-related report, or L1-SINR-related report for the CSI resource set(s) configured by the connected/associated second configuration information may be reported by a UE. Here, the L1-RSRP-related report and the L1-SNIR-related reports can be collectively referred to as a beam report. In particular, the first configuration information may include configuration information for options 1, 2, and 3, and may include configuration information for a group quantity.

Additionally, the first configuration information may include a configuration for group-based (Beam) reporting (e.g., RRC parameter 'groupBasedBeamReporting'), and group-based (Beam) reporting may be configured/enabled by the configuration. Additionally, the number of N (N is a natural number) CSI resource groups subject to group-based (beam) reporting can be configured based on the first configuration information. Likewise, if group-based (Beam) reporting is configured/enabled, a UE reports information on a plurality of CSI resource that can be received simultaneously in beam reporting (e.g., L1-RSRP, L1-SNIR, etc.) according to the first configuration information.

Additionally, in relation to group-based (beam) reporting, the second configuration information may include information on N (N is a natural number) CSI resource pairs/groups. Here, N CSI resource groups are each configured with M CSI resources, and M CSI resources can be selected one by one from each of the M CSI resource sets. Here, the M CSI resources for each of the N resource pairs/groups can be simultaneously received by the UE (i.e., the reference signal can be received simultaneously on the corresponding CSI resources). That is, M CSI resources belonging to the same resource pair/group (i.e., one selected from each of the M CSI resource sets) can be received simultaneously.

That is, when group-based (beam) reporting is configured, a UE performs beam reporting on the N CSI resource pairs/groups grouped/paired by selecting one from each of the M CSI resource sets (i.e., indexes of CSI resources belonging to the corresponding CSI resource pair/group and beam measurement (e.g., L1-RSRP, L1-SINR, etc.) information of the corresponding CSI resources).

A base station transmits a reference signal (e.g., CSI-RS, SSB, etc.) on a plurality of CSI resources of a plurality (i.e., M) CSI resource set based on configuration information to a UE (S1802).

That is, a base station may transmit a reference signal (e.g., CSI-RS, SSB, etc.) on a plurality of CSI resources in the M CSI resource set configured by the second configuration information. Here, as described above, a UE can simultaneously receive a reference signal on M CSI resources belonging to the same resource pair/group (i.e., one selected from each of the M CSI resource sets).

A base station receives CSI from a UE based on the configuration information (S1803).

Here, when the number (i.e., N) of CSI pairs/groups subject to group-based (beam) reporting and group-based (beam) reporting is configured by the first configuration information, a base station receives beam reporting (e.g., L1-RSRP, L1-SNIR) on N CSI resource pairs/groups grouped/paired from the M CSI resource sets associated with the first configuration information. In other words, a base station may receive, from a UE, beam reporting (e.g., L1-RSRP, L1-SNIR) for pairs/groups of CSI resources generated by selecting CSI resources simultaneously received from each of the M CSI resource sets.

Here, as in the previously proposed method, even if N CSI resource pairs/groups are configured according to the first configuration information, a base station can receive beam reporting (e.g., L1-RSRP, L1-SNIR) for N' (N' is a natural number, 2≤N'≤N) CSI resource pairs/groups (i.e., CSI includes only beam reports for N' CSI resource pairs/groups). Here, beam reporting for a specific CSI resource among CSI resources belonging to N' CSI resource pairs/groups is performed using beam measurement values (e.g., L1-RSRP value, L1-SNIR value), and beam reporting for other CSI resources can be performed with differential beam measurement values (e.g. differential L1-RSRP value, differential L1-SNIR value) calculated with reference to the beam measurement value (e.g., L1-RSRP value, L1-SNIR value) for the specific CSI resource. Additionally, a base station may receive information indicating a CSI resource set associated with the specific CSI resource in the CSI from a UE.

Here, whether the CSI includes only reports on the N' CSI resource pairs/groups may be determined based on the size of the N value. For example, when N is 2 or less, a base station can always receive reporting on the configured N CSI resource pairs/groups from a UE. On the other hand, if N exceeds 2, a base station can receive reporting on N' CSI resource pairs/groups from a UE.

In addition, when only reports on N' CSI resource pairs/groups are included in the CSI, the CSI may include the N' value, which is information on the number of CSI resource pairs/groups being reported. In this case, since the CSI only includes reports on N' CSI resource pairs/groups, a payload size of the CSI can be determined/changed based on the N' value.

Alternatively, even if only reports on N' CSI resource pairs/groups are included in the CSI, a payload size of the CSI may be fixed to a size when it includes reports on the N CSI resource groups. In this case, dummy bits or a known sequence may be added to a payload of the CSI other than reporting on the N' CSI resource groups.

In addition, when only reporting on N' CSI resource pairs/groups is performed through the CSI, the N' CSI resource groups may be determined as CSI resource group (s) in which differential beam measurement values (e.g., differential L1-RSRP values or L1-SINR values) can be quantized into 4 bits.

Alternatively, without the above limitations, if more than 4 bits are required when quantizing the differential beam measurement values (e.g., differential L1-RSRP values or L1-SINR values) to a 2 decibel (dB) step size, for calculation of the differential beam measurement values (e.g., differential L1-RSRP values or L1-SINR values), the step size may be configured to a value exceeding 2 dB, or a bit width for reporting the differential beam measurement values (e.g., differential L1-RSRP values or L1-SINR values) may be configured to a value exceeding 4 bits. Here, the configuration for the step size or the bit width may be limited to apply only to one or more specific CSI resource sets that are part of M CSI resource sets configured in a UE. Alternatively, the configuration for the step size or the bit width may be limited to apply only to one or more CSI resource pairs/groups that are part of N (or N') CSI resource pairs/groups.

General Device to which the Present Disclosure May be Applied

Figure 19:
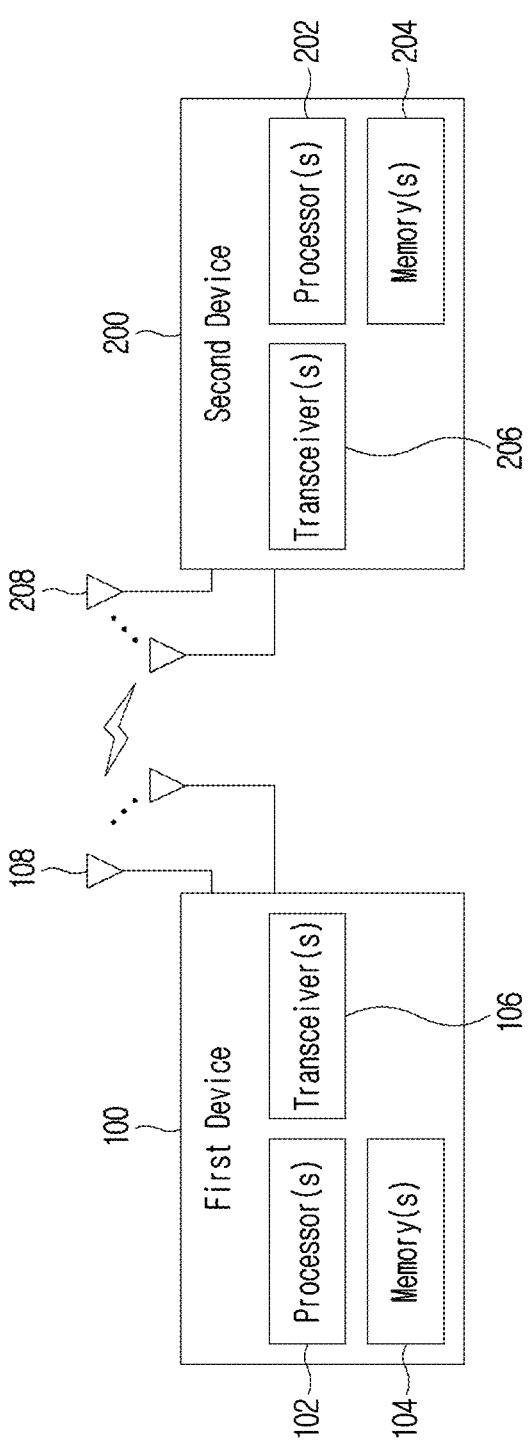
FIG. 19 illustrates a block diagram of a wireless communication device according to an embodiment of the present disclosure.

FIG. 19 is a diagram which illustrates a block diagram of a wireless communication device according to an embodiment of the present disclosure.

In reference to FIG. 19, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/ channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method of transmitting channel state information (CSI) in a wireless communication system, the method performed by a user equipment (UE) comprising:
receiving, from a base station, first configuration information related to CSI reporting and second configuration information related to CSI resources, wherein based on group-based reporting being configured by the first configuration information, the second configuration information includes information on M (M is a natural number) CSI resource set associated with the first configuration information;
receiving, from the base station, a CSI-reference signal (CSI-RS) on a plurality of CSI resources of the M CSI resource set based on the second configuration information; and
transmitting, to the base station, the CSI based on the first configuration information,
wherein based on reporting for N (N is a natural number) CSI resource groups being configured by the first configuration information, each of the N CSI resource groups is configured with M CSI resources including one CSI resource from each of the M CSI resource sets,
wherein the M CSI resources for each of the N resource groups are simultaneously received by the UE,
wherein the CSI includes i) a layer1-reference signal received power (L1-RSRP) value or a layer 1-signal to interference and noise ratio (L1-SINR) value for a specific CSI resource within N' (N' is a natural number, 2≤N'≤N) CSI resource group and ii) differential L1-RSRP values or L1-SINR values for CSI resources other than the specific CSI resource in the N' CSI resource groups,
wherein the differential L1-RSRP values or L1-SINR values are calculated with reference to the L1-RSRP value or L1-SINR value for the specific CSI resource, and
wherein the CSI further includes information indicating a CSI resource set associated with the specific CSI resource.

2. The method of claim 1, wherein whether the CSI includes only reports for the N' CSI resource groups is determined based on the size of value of the N.

3. The method of claim 1, wherein based on the CSI including only reports for the N' CSI resource groups, the CSI further includes a value of the N', that is information on a number of reported CSI resource groups, and
wherein a payload size of the CSI is determined based on the value of N'.

4. The method of claim 1, wherein a payload size of the CSI is fixed to a size when including reports on the N CSI resource groups, and
wherein based on the CSI including only reports for the N' CSI resource groups, dummy bits or a known sequence are added to reports on the N' CSI resource groups in a payload of the CSI.

5. The method of claim 1, wherein the N' CSI resource groups are determined as CSI resource groups in which the differential L1-RSRP values or L1-SINR values can be quantized into 4 bits.

6. The method of claim 1, wherein based on more than 4 bits being required when quantizing the differential L1-RSRP values or L1-SINR values with a 2 decibel (dB) step size, a step size for the differential L1-RSRP values or L1-SINR values is configured to a value exceeding 2 dB, or a value whose bit width exceeds 4 bits.

7. The method of claim 6, wherein a configuration for the step size or the bit width apply only to one or more specific CSI resource sets.

8. The method of claim 6, wherein a configuration for the step size or the bit width apply only to one or more specific CSI resource groups.

9. A user equipment (UE) of transmitting channel state information (CSI) in a wireless communication system, the UE comprising:

at least one transceiver for transmitting and receiving a wireless signal; and at least one processor for controlling the at least one transceiver, wherein the at least one processor configured to:

receive, from a base station, first configuration information related to CSI reporting and second configuration information related to CSI resources, wherein based on group-based reporting being configured by the first configuration information, the second configuration information includes information on M (M is a natural number) CSI resource set associated with the first configuration information;

receive, from the base station, a CSI-reference signal (CSI-RS) on a plurality of CSI resources of the M CSI resource set based on the second configuration information; and transmit, to the base station, the CSI based on the first configuration information, wherein based on reporting for N (N is a natural number) CSI resource groups being configured by the first configuration information, each of the N CSI resource groups is configured with M CSI resources including one CSI resource from each of the M CSI resource sets, wherein the M CSI resources for each of the N resource groups are simultaneously received by the UE, wherein the CSI includes i) a layer1-reference signal received power (L1-RSRP) value or a layer 1-signal to interference and noise ratio (L1-SINR) value for a specific CSI resource within N' (N' is a natural number, 2≤N'≤N) CSI resource group and ii) differential L1-RSRP values or L1-SINR values for CSI resources other than the specific CSI resource in the N' CSI resource groups, wherein the differential L1-RSRP values or L1-SINR values are calculated with reference to the L1-RSRP value or L1-SINR value for the specific CSI resource, and wherein the CSI further includes information indicating a CSI resource set associated with the specific CSI resource.

10. A base station of receiving channel state information (CSI) in a wireless communication system, the base station comprising:

at least one transceiver for transmitting and receiving a wireless signal; and at least one processor for controlling the at least one transceiver, wherein the at least one processor configured to:

transmit, to a user equipment (UE), first configuration information related to CSI reporting and second configuration information related to CSI resources, wherein based on group-based reporting being configured by the first configuration information, the second configuration information includes information on M (M is a natural number) CSI resource set associated with the first configuration information;

transmit, to the UE, a CSI-reference signal (CSI-RS) on a plurality of CSI resources of the M CSI resource set based on the second configuration information; and receive, from the UE, the CSI based on the first configuration information, wherein based on reporting for N (N is a natural number) CSI resource groups being configured by the first configuration information, each of the N CSI resource groups is configured with M CSI resources including one CSI resource from each of the M CSI resource sets, wherein the M CSI resources for each of the N resource groups are simultaneously received by the UE, wherein the CSI includes i) a layer1-reference signal received power (L1-RSRP) value or a layer 1-signal to interference and noise ratio (L1-SINR) value for a specific CSI resource within N' (N' is a natural number, 2≤N'≤N) CSI resource group and ii) differential L1-RSRP values or L1-SINR values for CSI resources other than the specific CSI resource in the N' CSI resource groups, wherein the differential L1-RSRP values or L1-SINR values are calculated with reference to the L1-RSRP value or L1-SINR value for the specific CSI resource, and wherein the CSI further includes information indicating a CSI resource set associated with the specific CSI resource.

* * * * *